Nov. 3, 1970   J. F. REUTELER   3,538,315
NUMERICAL CONTROL SYSTEM
Filed April 17, 1967   14 Sheets-Sheet 1
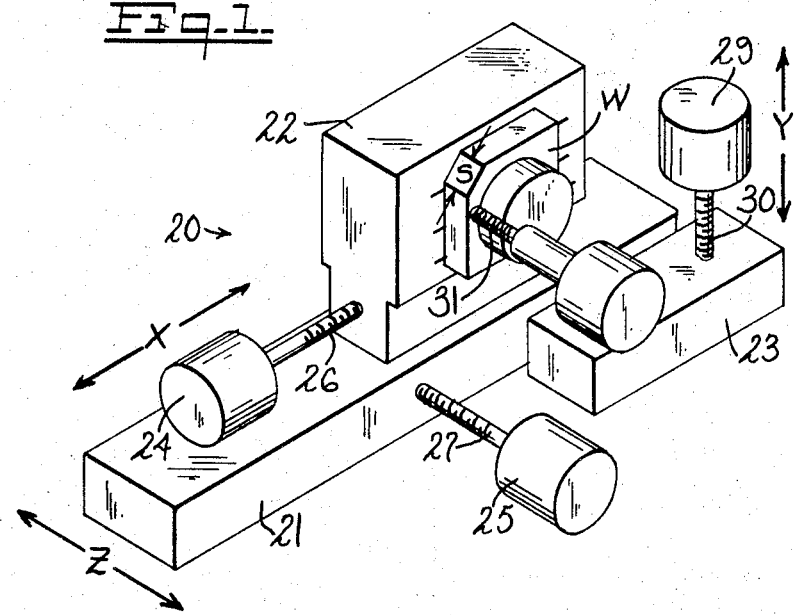
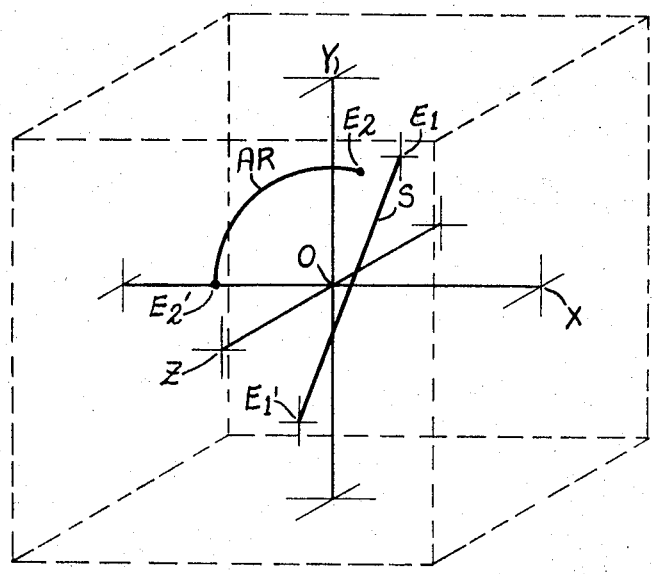
INVENTOR
Johann F. Reuteler
BY   DeLio and Montgomery
ATTORNEYS

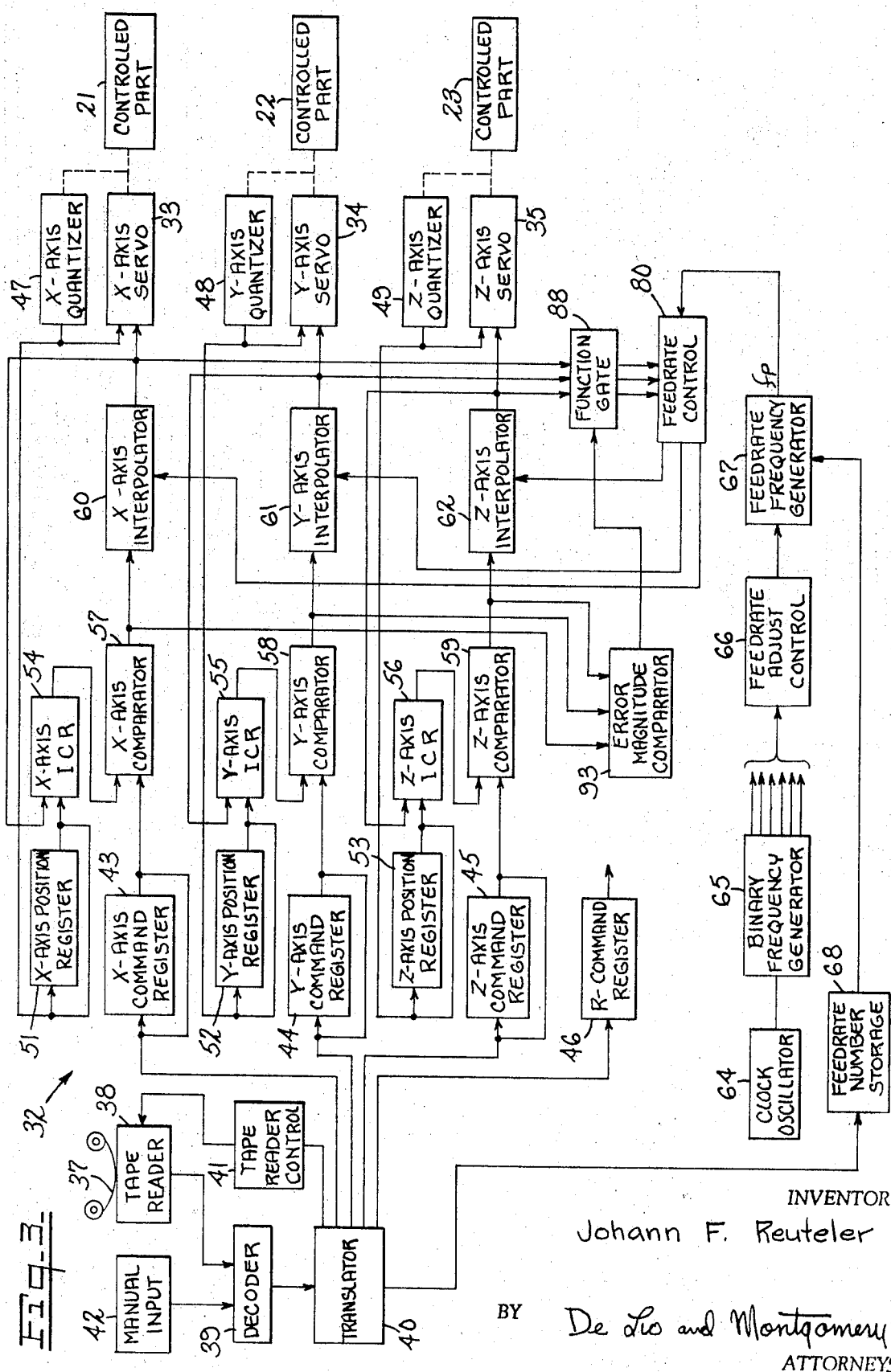

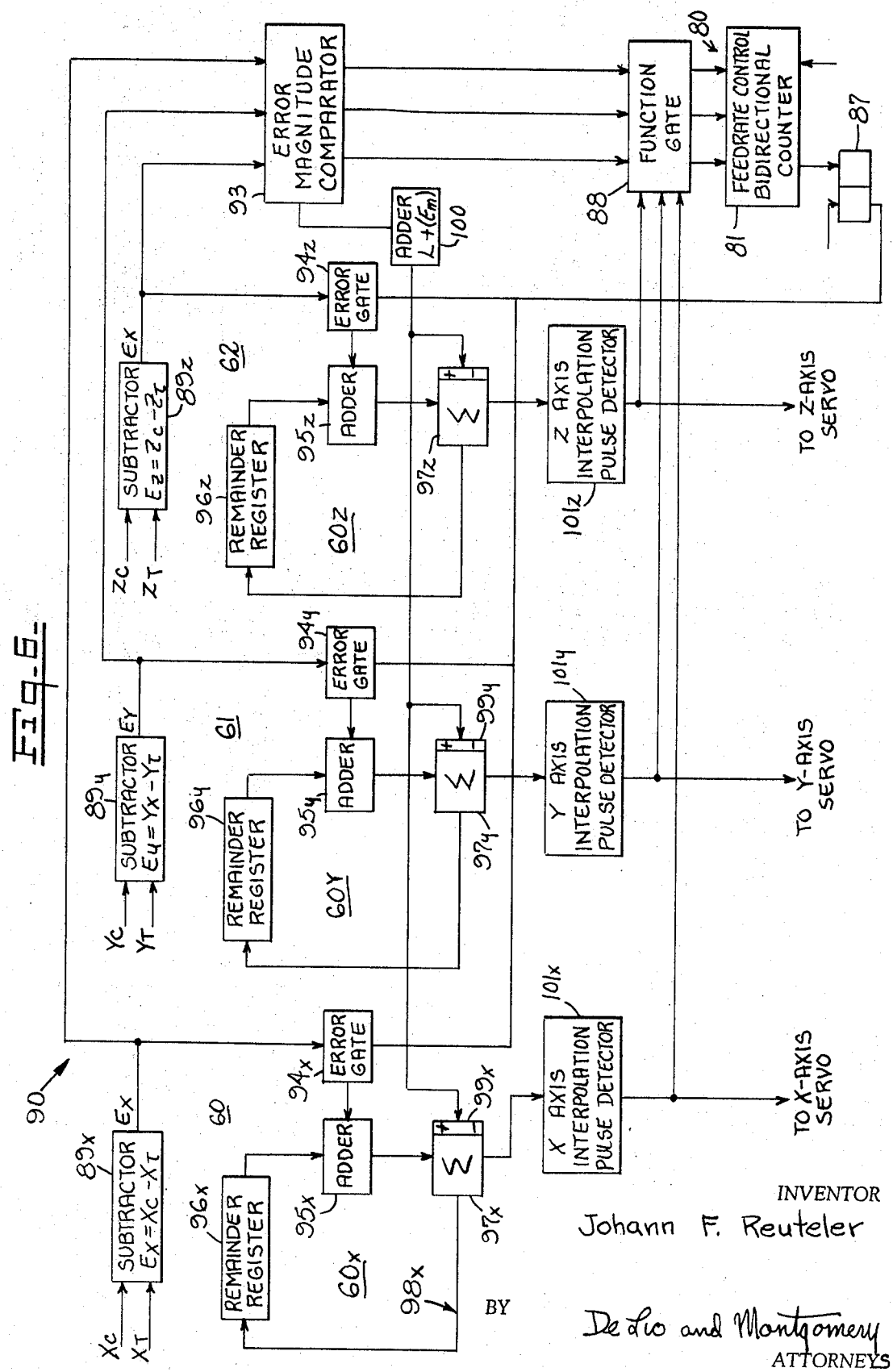

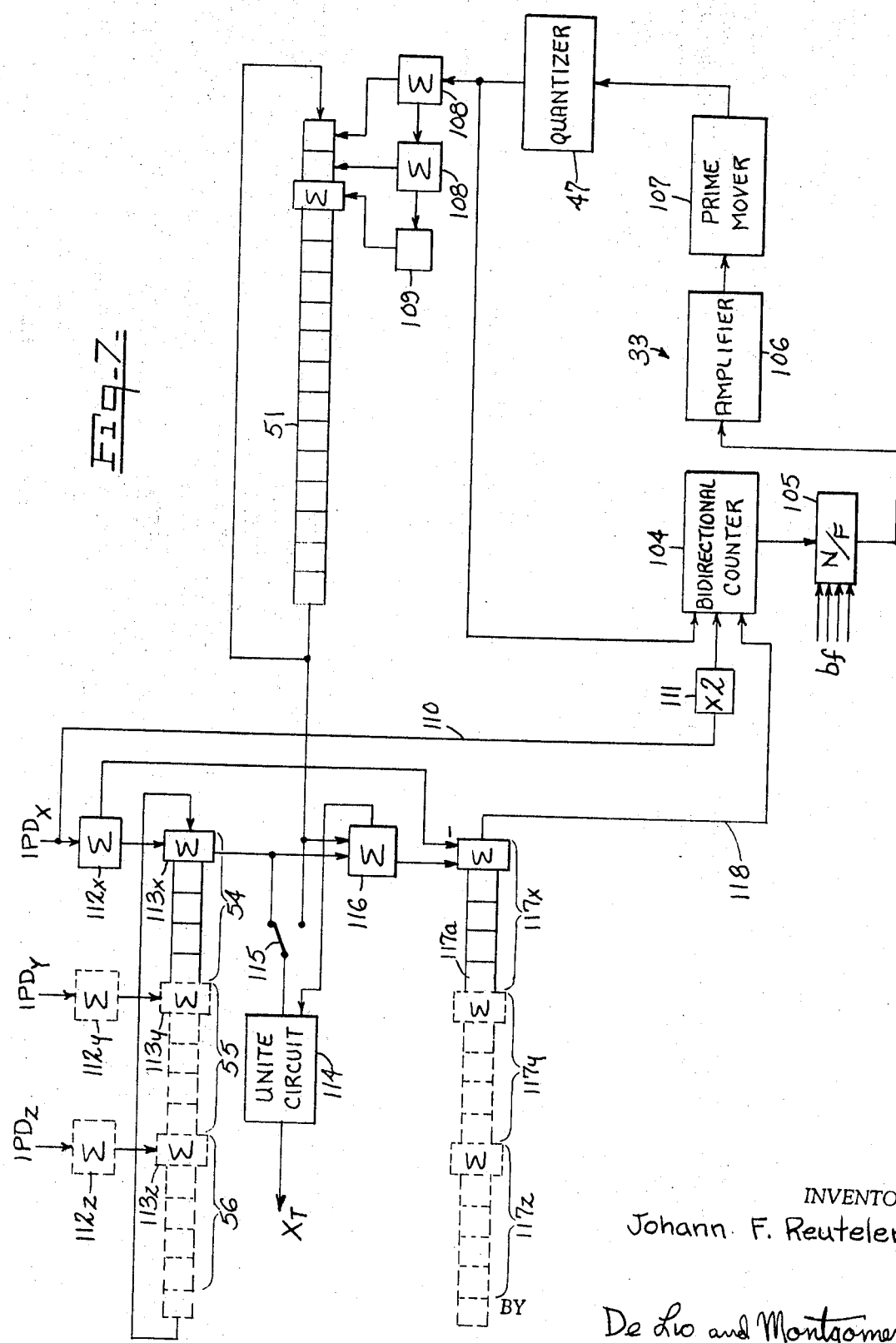

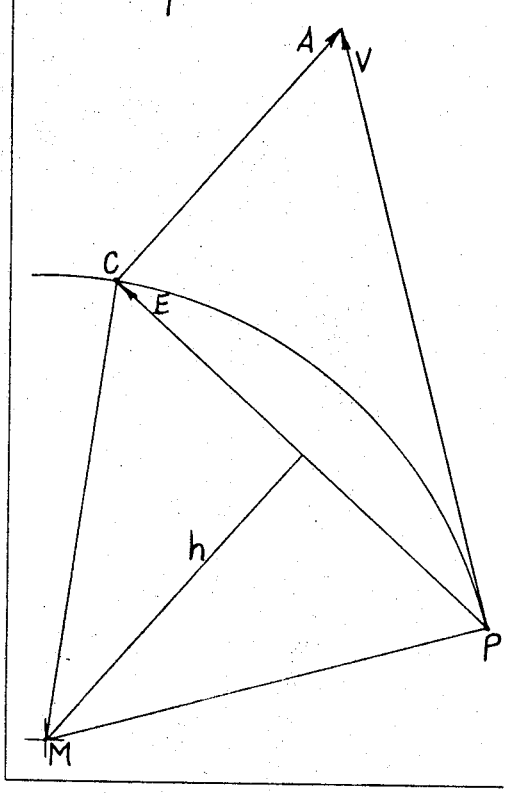
Fig-8a-
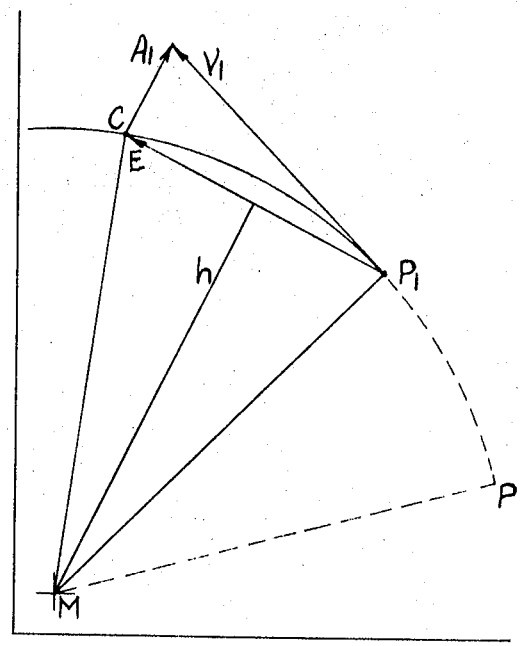
Fig-8b-
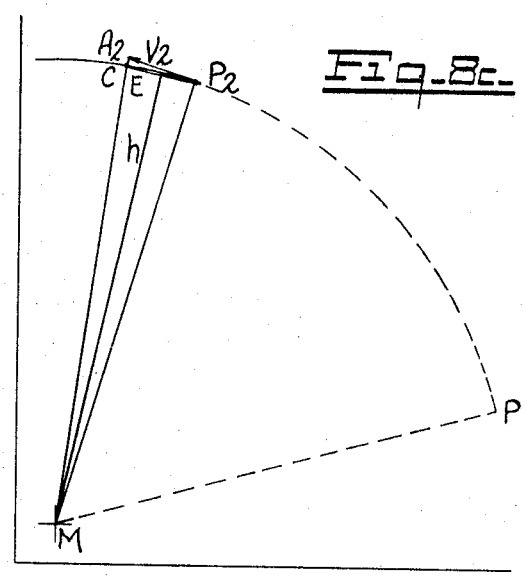
Fig-8c-
INVENTOR
Johann F. Reuteler
BY De Lio and Montgomery
ATTORNEYS

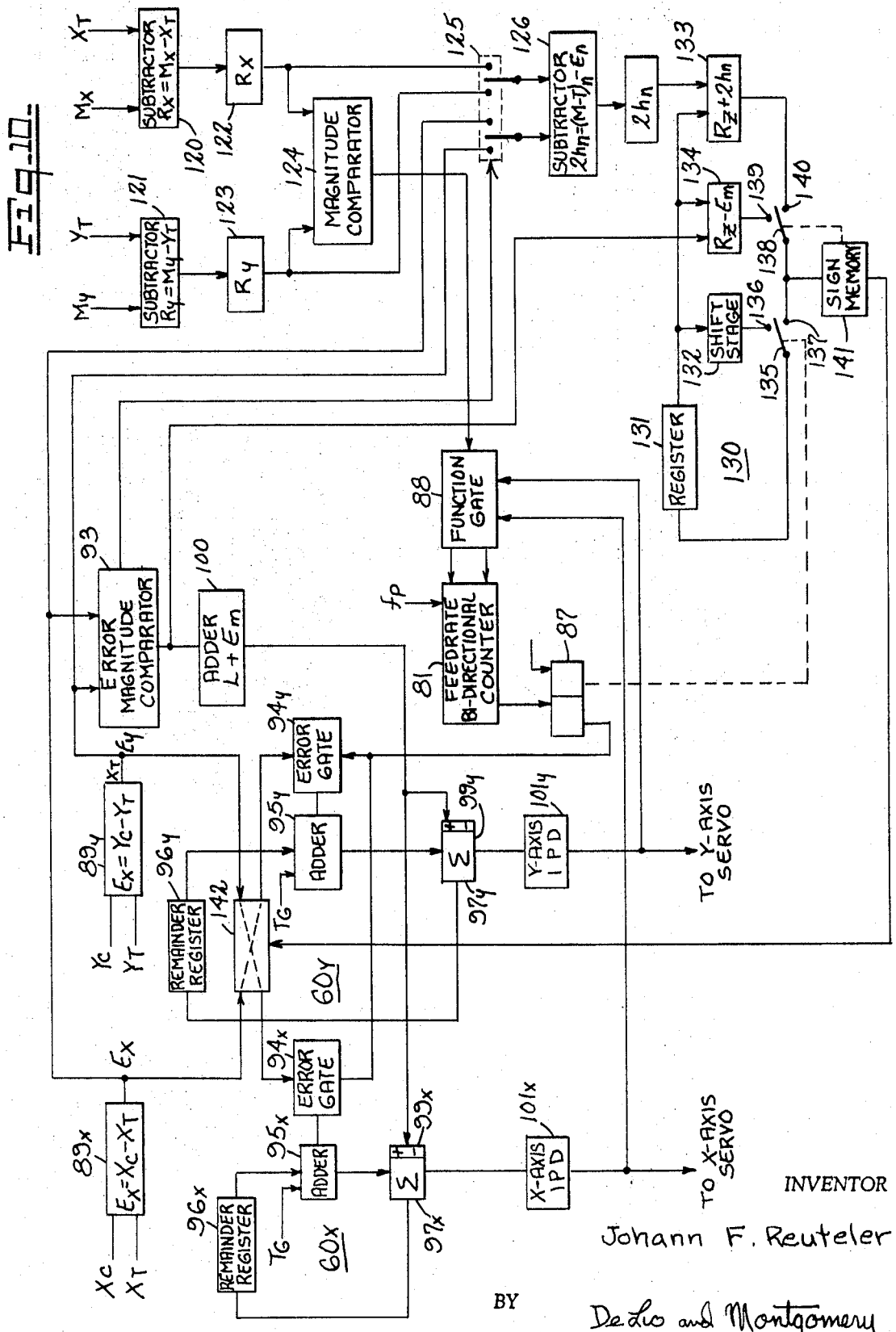

INVENTOR
Johann Reuteler

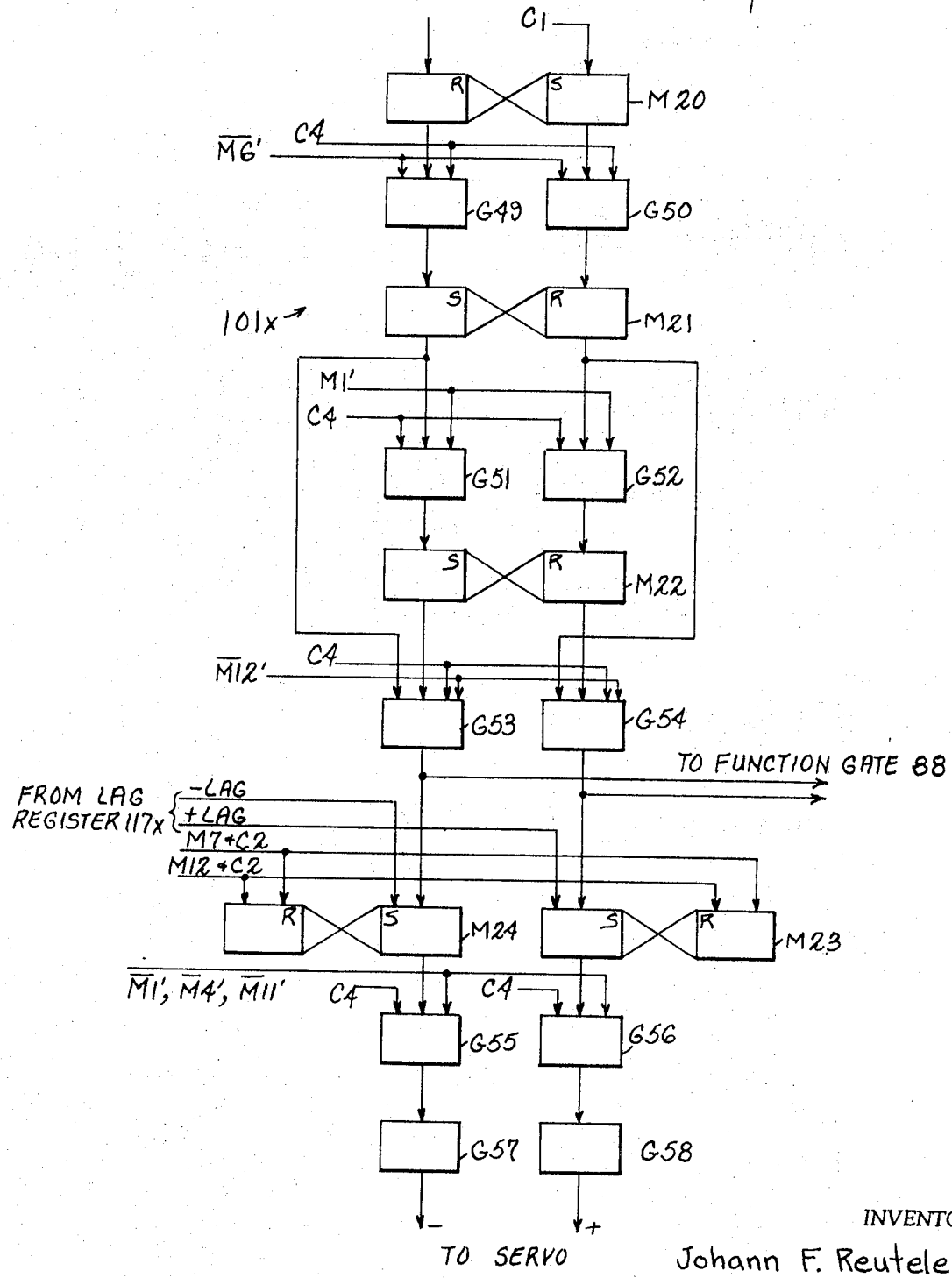

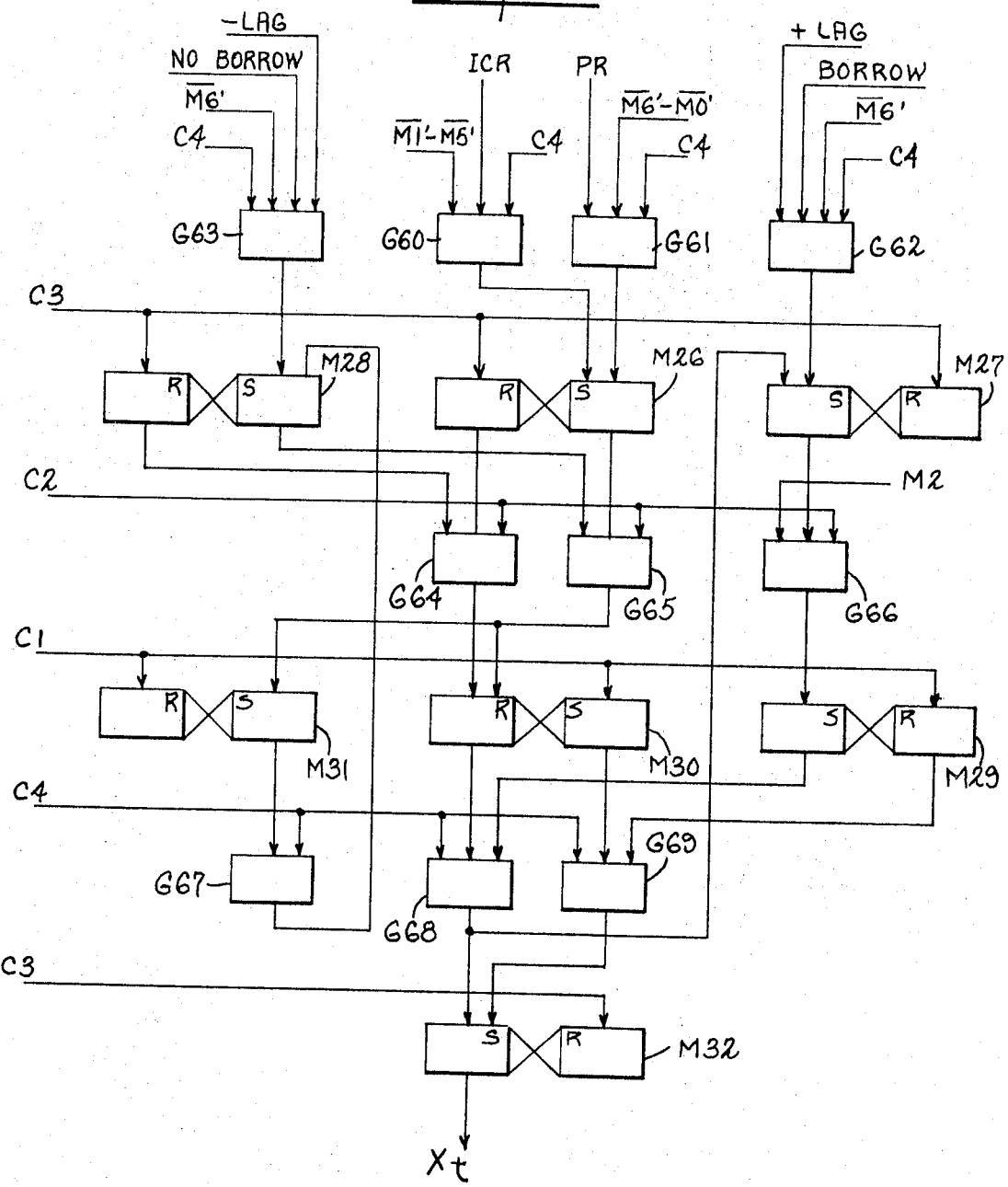

United States Patent Office 3,538,315
Patented Nov. 3, 1970

3,538,315
NUMERICAL CONTROL SYSTEM
Johann F. Reuteler, Elmwood, Conn., assignor to Pratt & Whitney Inc., West Hartford, Conn., a corporation of Delaware
Filed Apr. 17, 1967, Ser. No. 631,214
Int. Cl. G06f 15/46; G05f 19/22
U.S. Cl. 235—151.11                              32 Claims

ABSTRACT OF THE DISCLOSURE

A numerical control system for simultaneously moving a plurality of parts, each with respect to a given axis so as to define a desired path of movement between an existing point and a commanded point. To synchronize the relative velocities of the parts, distinct pulse trains are generated having repetition rates determined by existing position errors with respect to each axis with all related to the same quantity, and having a number of pulses proportional to the distance to be traveled along each axis. The existing position errors are detected at a rate proportional to a programmed feedrate. The programmed feedrate is further modified by the production of pulses of each train to provide velocity and deceleration control of the parts.

---

This invention relates to numerical control systems, and more particularly relates to such systems arranged to control movement from one point to another in a coordinate axis system along a predetermined path.

Such systems are designed to accomplish movement or relative movement of parts by what is termed linear and circular interpolation along predetermined slopes or arcs between existing points and a commanded point. To accomplish such motion, the various parts must move along coordinate axes at specified relative rates to define the desired path.

Control of such motions along two or more coordinate axes is effected in machine tools to move a workpiece relative to a tool to achieve or define a desired path on the workpiece. For example, both the spindle of the machine tool and workpiece carrying tables thereof may move along coordinate axes while a cutting tool is operating on the workpiece.

In numerical control systems for controlling the relative motion of parts, a generally used technique is to generate a plurality of pulse trains in which the repetition rate of the pulses of each train is indicative of the velocity of movement of a part with respect to one axis, and each pulse is indicative of a commanded unit of movement.

The present invention generally relates to systems of this type. However, it provides new and improved and more simplified techniques of generating the pulse trains so that the frequency of each pulse train is continuously proportional to the magnitude of the existing position error of a part with respect to the axis along which it moves. In this manner, all controlled parts move at rates determined by the existing axes errors, and distances equal to such errors. To define a circular path or arc, the aforementioned techniques are utilized but the positional error information is modified and applied to command pulse generation or iteration means as a function of the chord of the circular path and the perpendicular thereto from the center of curvature. Such information is indicative of the coordinate velocity components of the controlled parts. The movement of the parts is then controlled in accordance with the existing position errors and the relative coordinate velocities of the controlled parts.

To accomplish such motion, new and improved logic is provided which samples the existing position errors at predetermined rates, and simultaneously generates independent pulse trains at the desired proportional repetition rates. The invention further provides new and improved feedrate control means which regulate steady state velocity and deceleration of the controlled parts by modifying the programmed feedrate in accordance with actual movement of the parts. This prevents undesired stress on the controlled parts when movement thereof is initiated, and essentially eliminates end point error inasmuch as when the controlled points approach their commanded end points, the rate of movement thereof is dependent only on the existing errors which are decreasing toward zero.

In numerical control systems, trains of command pulses are supplied to servo systems for each controlled part from an interpolation system. Each servo system moves its controlled part an incremental distance for each command pulse received at a rate proportional to the rate of receipt of command pulses. Such servo systems include a quantizing device and position register for quantizing the resultant movement of the controlled part and storing numerical data representing the resulting position of the controlled part. The command pulses are generated or iterated by an interpolation system which receives numerical information indicative of the commanded end point of movement of each controlled part and supplies pulses to the servo systems to accomplish movement along each axis to define the desired path.

It is well known that there are inherent lags due to time delays, inertia, etc. in any servo system. Accordingly, the controlled part cannot instantaneously follow the commanded increments of movement. Accordingly, the actual position of the controlled part as expressed by the numerical data in the position register lags behind the instantaneous commanded position. If the positional information as expressed by the servo system position register is utilized in the interpolation system to indicate the position of the controlled part, undue momentary distortions and inaccuracies may result in the desired path. The interpolation system should receive a position signal indicative of the position of the controlled part as if there was no lag in the system.

In the present invention means are provided to determine the instantaneous commanded position from the produced command pulses to provide interpolated position data in numerical form which does not reflect the inherent lag in time delays in the system. The invention further provides a means for determining the acutal lag of the controlled part behind its instantaneous commanded position and supplying a lag control signal to the servo system.

Accordingly, an object of this invention is to provide a new and improved numerical control system which accomplishes linear and circular interpolation.

Another object of this invention is to provide a new and improved numerical control system of the type described in which the rate of movement of the parts is controlled by the existing position errors as defined by the instantaneous commanded position of the parts and their commanded end position.

Another object of this invention is to provide a numerical control system having a new and improved means for controlling and coordinating the deceleration of a plurality of controlled parts to accurately stop said parts simultaneously at their commanded end points.

Another object of this invention is to provide a new and improved numerical control system of the type described wherein command pulses are iterated to each axis servo system independently but at relative rates determined by the relative magnitudes of the existing position errors of the controlled parts.

A further object of this invention is to provide a numerical control system having new and improved means for interpolating the actual position of a controlled part to show its instantaneous commanded position and thereby compensate for system lag.

A still further object of this invention is to provide a system of the type described having means for determining the actual lag of the controlled part behind the instantaneously commanded position, and supplying a lag control signal to the servo system.

The features of the invention which are believed to be novel are distinctly set forth and particularly claimed in the concluding portion of this specification. However, the invention both as to its organization and operation, together with further objects and advantages thereof, may best be appreciated by reference to the following detailed description taken in conjunction with the drawings, in which:

FIG. 1 is a perspective representation of parts of a machine tool which may be controlled in movement by a system embodying the invention;

FIG. 2 is a diagram of a three coordinate axes system;

FIG. 3 is a diagram in block form of a three axes numerical control system in which the invention may be embodied;

FIG. 6 is a diagram partly in block form showing the relation of the feedrate control of FIG. 4 to the interpolators of FIG. 5.

FIG. 7 is a diagram, partly schematic and partly in block form showing a servo system and further showing the relationship of an instantaneous command network, a lag compensation network and an interpolated position network in relation thereto;

Figure 9:
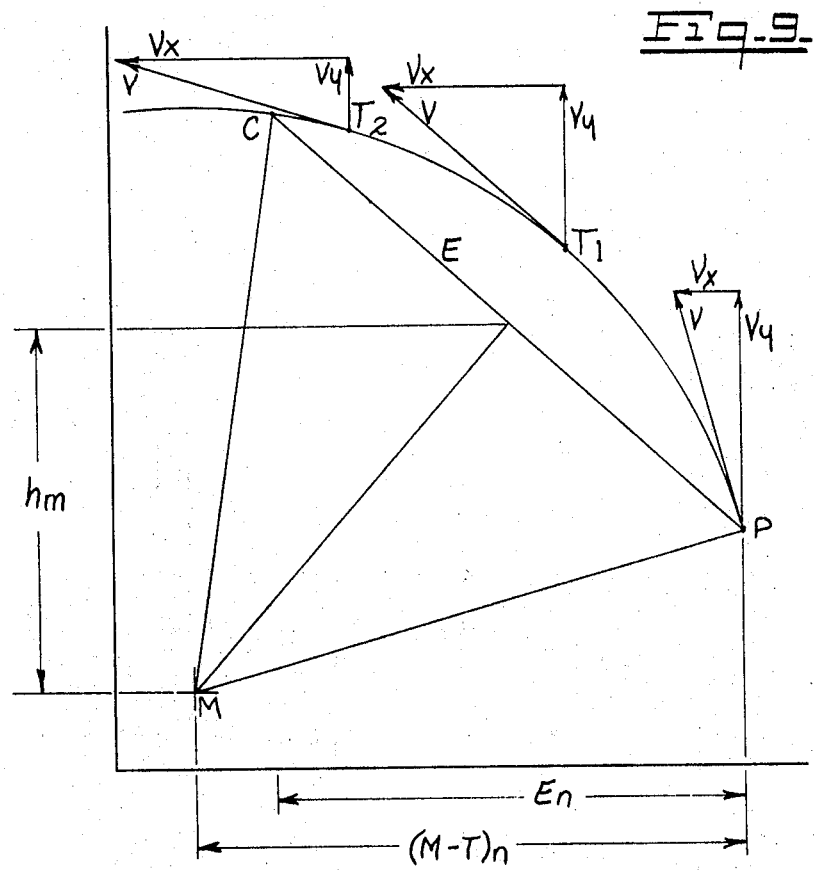

FIGS. 8a, 8b, and 8c are graphic diagrams of the relative motion of controlled parts during circular interpolation;

FIG. 9 is a graphic representation of the velocity coordinates of parts moving relative in a two axes system to define an arc.

FIG. 10 is a diagram in block form of the axes interpolation systems arranged for circular interpolation.

Figure 11:
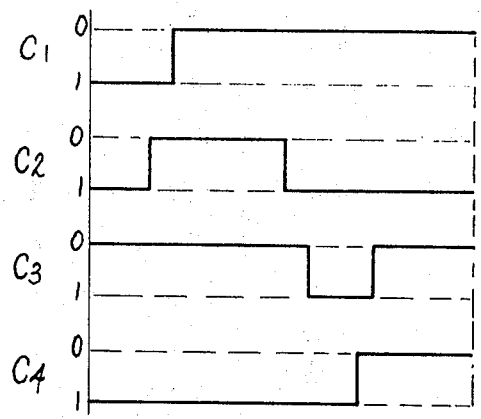

FIG. 11 is a diagram of pulse waveforms utilized in controlling the system.

Figure 12:
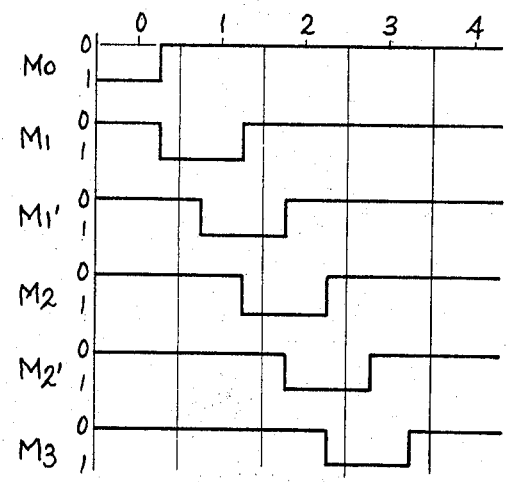

FIG. 12 is a diagram of marker or timing waveforms utilized in the system.

FIGS. 13a, 13b, 14a and 14b are schematic diagrams exemplifying logic elements used in the disclosed system.

FIGS. 15 through 21 are schematic diagrams of circuits which may be utilized in a system embodying the invention.

The present system may be utilized to control the relative motion of a plurality of parts along the plural axes system. Such a system may be utilized to control the relative motions of a coordinate axis of a machine tool, generally exemplified by the reference numeral 20. FIG. 1. This machine tool may comprise a bed or table 21 having a second bed or table 22 thereon, which is movable in two coordinate axes identified as the X and Z axes, and a spindle block 23, movable about a third coordinate Y axis. The spindle block 23 is mounted in a machine frame, not shown, and the table 21 is movable along the X and Z axes by drive motors 24 and 25, and associated lead screws 26 and 27, respectively. Spindle block 23 with spindle 28 thereon is movable along the Y axis by means of a motor 29 and lead screw 30.

FIG. 2 illustrates a three axes coordinate system. Relative movement of the parts 21, 22 and 23 along controlled paths may be utilized to move a cutting tool 31 along a slope S with respect to a workpiece W, or along an arc AR.

The system hereinafter described may be considered to have a zero reference or center point 0 and all movements of the controlled parts are commanded to an end point $E_1$ or $E_2$ from existing point $E_1'$ or $E_2'$, with respect to the distance the parts must move along each axis to reach such end point, Assume that the slope S is to be defined on a workpiece W by cutting tool 31, and the cutting tool is at point $E_1'$. The control system will have stored therein the coordinates of the point $E_1'$, with respect to 0. When the coordinates of point $E_1$ are read into the system, errors will be indicated along all axes, which errors are indicative of the coordinate distances between the points $E_1$ and $E_1'$. The system will interpolate this error into movement and velocity commands for each of motors 24, 25 and 29 and the parts 21, 22, and 23 will move so that cutting tool 31 will define the path S (surface S, FIG. 1) on workpiece W. This is referred to as linear interpolation. Where the controlled parts are moved so that the cutting tool 31 defines an arc AR. this is referred to as circular interpolation.

Reference is now made to FIG. 3 which shows in block diagram a numerical control system 32 in which the invention may be embodied. The motors 24, 29 and 25 which drive the controlled machine parts are driven by servo systems for each axis 33, 34 and 35 which include the drive motors. The servo systems 33, 34 and 35 are of the pulse responsive type which move a controlled part a unit distance for each pulse received at a rate proportional to the rate of application of pulses thereto.

In the system 32 movement instructions are encoded on a tape 37 or other record medium, in binary or binary coded decimal form. Then, as each row or line on the tape is read by a tape reader 38, it is decoded by a decoder 39 and translated into pure binary form by translator 40. The operation of the tape reader 38, decoder 39 and translator 40 is coordinated and controlled by a tape reader control network 41, which tells the tape reader when to advance to read another block of information in response to signals from the decoder and translator. The reading, decoding and translating systems of the type set forth here are well known to those skilled in the art and need not be described in detail. The system may also have a manual input 42 for the machine operator to directly read the coordinates of a point into the system.

The commanded point for each axis is transmitted from translator 40 to command registers 43, 44, 45 and 46. The commands are in the form of coordinates with respect to each axis and with respect to reference point 0. The coordinate points may be either plus or minus with respect to point 0. The X, Y and Z registers are recirculating binary registers which store a commanded position in the form of a coordinate point for the particular axis. The R command register 46 is utilized during circular interpolation to store radius commands for generating an arc AR. When X, Y and Z servos move a machine part, quantizers 47, 48 and 49 generate discrete pulses, each indicative of a predetermined unit of distance along its respective axis. The quantizers are preferably of the electro-optical type as described in the copending application of Johann Reuteler and Robert Anderson, Ser. No. 577,891, filed Sept. 8, 1966, assigned to the same assignee as this application. The quantizer pulses are applied to X, Y and Z position registers 51, 52 and 53, respectively. The position registers contain in binary form the actual position of a part along a particular axis with respect to reference point 0. Both the command registers and position registers are preferably recirculating registers having the same number of binary digets (bits). For purposes of discussion it will be assumed that these registers all have sixteen bits, one of which indicates a numerical sign.

To control movement of each part along its respective axis, the instantaneous commanded position of the parts as represented by the information in instantaneous command registers (ICR) 54, 55 and 56 is compared with the commanded point in the command register for that axis in comparators 57, 58 and 59. The resulting information in the comparators 57, 58 and 59 is indicative of the existing error between the instantaneous commanded position of a particular machine part and the commanded position. This error signal is utilized to move the controlled part for that axis until the error diminishes to zero. Such comparison takes place each recirculation cycle, which is a predetermined number of clock cycles.

The result of the comparison of the commanded position and the interpolated position (from ICR) of each part is applied to an interpolator for each axis 60, 61 and 62. The interpolators 60, 61 and 62 generate or provide command pulses to servos 33, 34 and 35, respectively, at rates proportional to the existing errors between the commanded and interpolated position of each part. The rate of production of command pulses is further determined by a feedrate control network hereinafter described.

A clock pulse generator or oscillator 64 generates timing signals or pulses at predetermined intervals and such timing pulses are applied to all of the recirculating registers to produce a shift each clock cycle in a manner well known in the art. The clock pulses from clock oscillator 64 are also applied to a binary frequency generator 65 which may comprise a train of bistable multivibrators or flip-flops which operate between one of two stable states. The binary frequency generator of this type is well known to those skilled in the art and basically comprises a chain of flip-flops connected together as a counter. The non-carry pulses from each flip-flop are detected to produce a plurality of trains of pulses which have binarily related frequencies and which pulses occur at distinct time intervals so that none are overlapping in the various pulse trains. These pulse trains which may be designated as $bf_1$–$bf_{16}$ are applied to a feedrate adjust control 66 which may be of the type disclosed in copending application of Johann Reuteler, Ser. No. 349,215, filed Mar. 4, 1964, now Pat. 3,417,303 and assigned to the same assignee as the present invention. The feedrate adjust control which may be manually set by the machine operator is applied to a feedrate frequency generator 67. Feedrate frequency generator 67 may be in the form of a pulse rate multiplier which multiplies a pulse frequency from feedrate control 66 by a number received from feedrate storage register 68 and yields a pulse frequency $f_p$ proportional to such multiplication. The feedrate number is applied to storage register 68 from translator 40. The feedrate number is predetermined on the tape input to command the rate of movement of the machine parts and particularly the relative movement of cutting tool 31 with respect to workpiece W.

Feedrate frequency generator 67 provides the pulse frequency $f_p$ which is determined by the feedrate number read from the tape and any manual override thereof made by the feedrate adjust control and the programmed feedrate.

The feedrate pulse frequency $f_p$ is applied to a feedrate control network 80 which determines the rate at which command pulses may be iterated by interpolators 60, 61 and 62. Feedrate control 80 applies enabling signals to interpolators 60, 61 and 62 and receives signals indicative of the output pulses therefrom through a function gate 88 as determined by an error magnitude comparator 93. Error magnitude comparator 93 determines the relative magnitudes of the interpolated position errors, receiving inputs from comparators 57, 58 and 59, and controls function gate 88 in response to such comparison. The iterated pulses from the interpolators 60, 61 and 62 are then applied to feedrate control 80 in a manner determined by function gate 88, as will be more fully described hereinafter.

During linear interpolation the controlled parts are caused to move relative to each other such that the cutting tool 31 defines a linear path from a first position $E_1$ to a second position $E_1'$, FIG. 2. Along this linear path the cutting tool 31 which may be a milling cutter would cut in a straight line S in three dimensions. It will be apparent that to define the straight line S as shown in the coordinate axes system of FIG. 2, the rate of movement of the parts must be synchronized with respect to each other during movement of the parts, and further so synchronized that the parts reach all of their coordinate end points at the same time. It will further be noted that the mathematical equation of the line S which represents a linear path with respect to three coordinate axes may be defined as $$A^2 = X^2 + Y^2 + Z^2 \tag{I}$$

While logic circuitry could be devised to program and control movement, or relative movement of the machine parts in accordance with Equation I, such logic circuitry would be rather complex and sophisticated.

Accordingly, the present invention provides new and improved means for controlling the resultant velocity of the machine parts as they move relatively along two or more axes. Such control is accomplished through an approximation of Equation I with limits imposed on the approximated equations dependent upon the slope of the line A.

An exemplary approximated equation is $$2.5V_r = 2.5G + M + .75S \tag{II}$$

where $V_r$ is the resultant vector with respect to three axes
G is the longest axis distance command (error)
M is the middle length axis distance command, and
S is the smallest axis distance command.

If the desired resultant path only resides in two axes, Equation II becomes $$2.5V_r = 2.5G + S \tag{III}$$

The manner in which the interpolation system operates in accordance with the above equations is hereinafter described.

In considering the interpolation system, there should be no confusion with the servo system which in a comparison device such as a bidirectional counter contain the instantaneous algebraic sum of the command pulses produced by the interpolation system and the quantizer pulses indicative of the actual distance traveled due to reception of the command pulses. The interpolation systems hereinafter described compute the existing position error between the coordinates of the commanded end position and the interpolated position, and produce command pulses at rates corresponding to such existing position errors.

As previously mentioned, the system is arranged to move a part from an existing point to a commanded point. At the beginning of said operation, the coordinates of the existing point will be numerically stored in the various axes position registers and the coordinates of the commanded point will be stored in the axes command registers. The difference between the existing coordinates of the parts with respect to the commanded points is spoken of as the position error. The position error for the X-axis, $E_x$ is given by $$E_x = X_c - X_t \tag{IV}$$

where $X_c$ is the X coordinate of the commanded point, and
$X_t$ is the X coordinate of the interpolated position of the controlled part.

The feedrate control network 80 includes a bidirectional counter 81. Feedrate pulses $f_p$ from feedrate frequency generator 67 (FIG. 3) are applied to the first three stages of counter 81 as positive counts. To insure that the inputs and carries in the second and third stages are non-coincident, shift stages 82 may be provided to delay the inputs for a fraction of a clock cycle. As the feedrate pulses are applied to counter 81, the count accumulated therein increases, and when the seventh and/or eighth stages accumulate binary ones, a signal is applied to a coincidence or "AND" gate 83, through an "OR" gate 84, which is opened periodically by a pulse $bf_4$ from binary frequency generator 65, which occurs every sixteen clock cycles, or every recirculation cycle.

Every other recirculation cycle, a pulse $bf_5$ is passed by an "AND" gate 85 if a one bit is present in the seventh stage of counter 81. Every fourth recirculation cycle, a pulse $bf_6$ is passed by an "AND" gate 86 if a bit is present in the sixth stage of binary counter 81. The outputs of gates 83, 85 and 86, if any, act as setting signals to a bi-stable device or flip-flop 87, hereinafter referred to as an iteration memory. When iteration memory 87 is set it opens error gates in the axes interpolation systems for one recirculation cycle, as hereinafter described. Memory 87 receives a resetting signal $bf_4'$ each recirculation cycle which occurs immediately before a $bf_4$ pulse.

Figure 4:
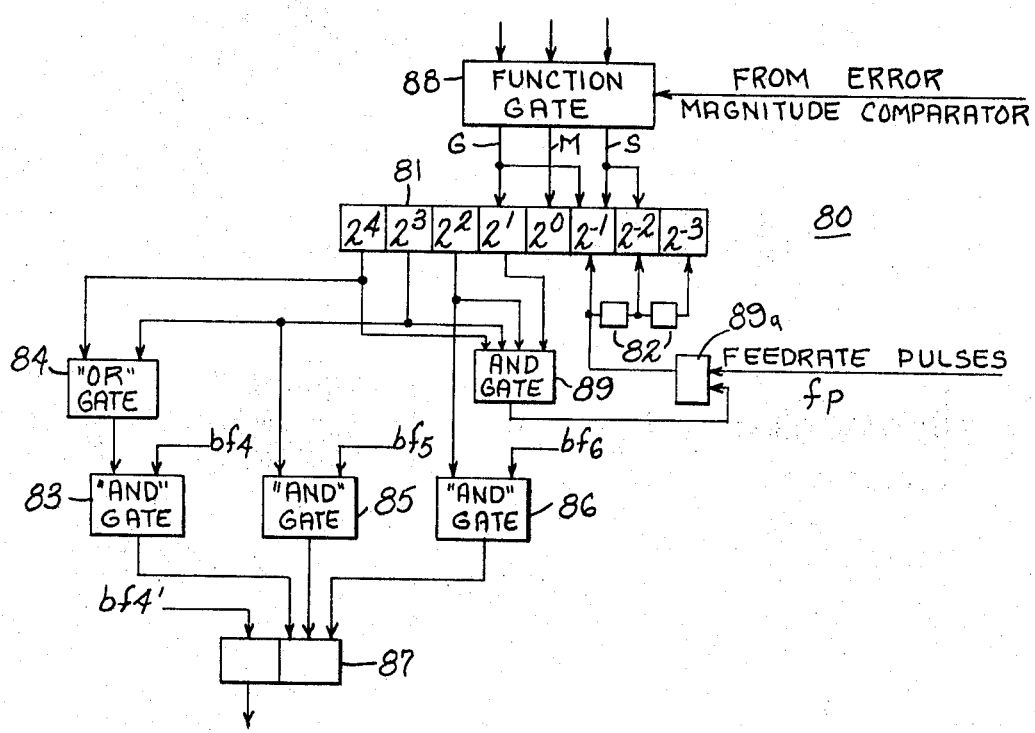
FIG. 4 is a diagram, partly schematic and partly in block form, illustrating a network for determining the feedrate of the controlled parts.

Command pulses from the interpolation system of each axis (FIG. 7) are applied to stages two, three, four and five of counter 81 as decrementing counts through a function gate 88. Function gate 88 is essentially a switching network, hereinafter described, which correlates the iterated axes command pulses to their appropriate stages in counter 81 dependent upon the commanded movement for each axis. In FIG. 4, the lines G, M and S correspond to G. M and S of Equations II and III. The necessary switching within gate 88 is responsive to detection of the magnitude of the axes errors, which is accomplished by an error magnitude comparator 93, FIG. 6, hereinafter described. The error magnitude comparator causes function gate 88 to apply the produced command pulses selectively to lines G, M and S. The lines G, M and S lead to stages of counter 81 having the numerical ratio of 2.5:1:.75 which corresponds to the coefficients of Equation II.

As the interpolation system for each axis produces a command pulse, such pulse decrements counter 81 in a relative numerical weight proportional to the error along that axis in relation to the coefficients of G, M and S (Equation II). For example, assume that the actual position of the cutting tool and the X, Y, Z coordinate axis is $X=5$, $Y=6$ and $Z=7$, and the cutting tool is commanded to define a straight line of cut to the point $X=10$, $Y=9$, $Z=8$. Referring to Equation II it may be seen that the greatest position error G is along the X axis, the middle position error is along the Y axis and the smallest position error is along the Z axis. The magnitudes of these errors will be detected by error magnitude comparator 93 and suitable switching signals applied to function gate 88 such that the iterated pulses from the X, Y and Z interpolation networks are applied through function gate 88 to lines G, M and S, respectively. Thus, each command pulse from the X axis interpolation system will decrement counter 81 two and one-half times greater than an iterated pulse from the Y axis interpolation network.

If the cutting tool is worked in only two axes, Equation III would be followed, and the iterated pulses from the two axes interpolation networks being utilized would be applied to lines G and M, depending upon the magnitude of the error along those axes.

To obtain movement of the parts to define the desired line, it will be apparent that the parts must move at relative velocities proportional to the relative position errors. Therefore, the rate at which command pulses for each axis are produced is proportional to the position error of that axis. Each command pulse produced is utilized to decrement counter 81.

To obtain movement of the parts to define the desired line, it will be apparent that the parts must move at relative velocities proportional to the relative position errors. Therefore, the rate at which command pulses for each axis are produced is proportional to the position error to that axis. Each command pulse produced is utilized to decrement counter 81.

With this operation of the feedrate control network it will be apparent that the number therein is a function of the feedrate frequency $f_p$ and the movement of the controlled parts.

To prevent overflow and resetting of counter 81, a coincidence gate 89 senses when the four highest order bits contain binary ones and blocks gate 89a to prevent application of additional feedrate pulses to counter 81. However, the one in the highest order position may still be the subject of a borrow due to the decrementing pulses applied over lines G, M and S.

Reference is now made to FIG. 6 which illustrates the linear interpolation system for three axes interpolation. The interpolation system 90 of FIG. 6 is set forth in functional block diagram and generally comprises an interpolation network 60, 61 and 62 for each axis, a feedrate control 80 (FIG. 6) and an error magnitude detector or comparator 93. Inasmuch as each of the interpolation networks is identical, only one will be explained in detail. The elements of each interpolator network bear like reference numerals with appropriate identifying letter suffixes $(x, y, z)$.

Interpolator 60 as shown in FIG. 6 includes comparator 57 in the form of a subtractor 89x which determines the difference between the command position $X_c$ and the actual position (or the interpolated position $X_t$ as hereinafter described) of the part movable along the X-axis. This subtractor subtracts the quantity $X_t$ which is the interpolated position of the bed 22, from the commanded position. The resulting absolute error, together with the absolute errors from the subtractors 89y and 89z of all interpolators 60, 61 and 62, is applied to error magnitude comparator 93 which determines the largest, medium and smallest absolute position error with respect to the three axes. The result of such comparison is applied to function gate 88, which makes appropriate connections of lines G, M and S (FIG. 4) to bidirectional counter 81.

The error $E_x$ is also applied to an error gate 94x which is periodically opened by iteration memory 87. When opened, the error gate 94x stays open for a full recirculation cycle so that the entire contents of subtractor 89x passes therethrough. The error, when gated through error gate 94x is applied to an adder 95x and is added to an existing number in a recirculating storage register, termed a remainder register 96x. This number in the remainder register with the error $E_x$ added thereto by means of adder 95x further circulates through a bidirectional adder or summer 97x where another number proportional to the magnitude of the largest of the position errors is either added thereto or subtracted herefrom. The resultant number then recirculates in the loop 98x comprising remainder register 96x, adder 95x and bidirectional adder 97x. Bidirectional adder 97x further includes a memory 99x which is set in a state indicative of the sign of the number in loop 98x.

Reference is now made to error magnitude comparator 93 which determines the largest of the existing axes errors. This error in absolute magnitude $E_m$ is applied to an adder 100 which contains a number L proportional to the response of the servo systems for each axis or, otherwise stated, contains at all times a number which is predetermined by the servo systems response. To this constant number L is added the absolute magnitude of the largest axes position error $E_m$. The resultant sum $L+E_m$ is applied to the bidirectional adders 97x, 97y and 97z of each interpolator, each recirculation cycle.

The number in the recirculating loop is modified each recirculation cycle by the sum $L+E_m$, and may further be modified by the error $E_x$, if iteration memory 87 opens error gate 94x. If error gate 94x is not opened, then the sum $L+E_m$ will cause the number in the recirculation loop to continuously bracket zero. Memory 99x is set to a condition indicative of the sign of the number in the recirculation loop each recirculation cycle. The sum $L+E_m$ is then applied in the opposite sign to that signified by sign memory 99x. For example, if the number in the recirculating loop is negative, the sum $L+E_m$ applied to adder 98x during the next recirculation cycle will be applied as a positive number, and vice versa. Such summation will cause the number in the recirculating loop to continuously and consecutively bracket zero, unless the error $E_x$ is added. When this occurs, the number in the recirculation loop may have the same sign in two or more consecutive recirculation cycles, or alternatively stated, the sum $L+E_m$ may be consecutively added or consecutively subtracted to the number in the recirculation loop in two consecutive recirculation cycles. Such occurrence is detected in an interpolation pulse detector 101x, which then generates or produces a command pulse which is applied to the X-axis servo system, as a command pulse, and also to bidirectional counter 81 of feedrate control 80 to decrement the count therein over one of lines G, M or S, FIG. 6.

If the error gate 94x is not opened the loop 98x will reach a state where the number therein alternates substantially between $L+E_m$ and $-(L+E_m)$. Assume that an error $E_x$ is now added to $L+E_m$, the resulting number in loop 98x is $E_x+(L+E_m)$, which is detected in sign by memory 99x. Then the quantity $-(L+E_m)$ will be added each recirculation cycle until the number in loop 98x goes negative. Memory 99x is set by a one sign and reset by another sign. If memory 99x does not change states each recirculation cycle, such lack of change of state is detected by interpolation pulse detector 101x, which then produces a command pulse. Consecutive numbers in loop 98x of one sign will indicate one direction of motion along the X-axis while consecutive numbers of the other sign will indicate the other direction of motion along the X-axis.

For a clearer understanding of the operation of the bi-directional adder and the recirculating loop, including remainder register, assume that the number RR in remainder register 96x is five, assume that the proportionality factor L is four, and further assume that the largest error $E_m$ is minus six, and $E_m = E_x$. Further assume that error gate 94x is opened every third recirculation cycle by feedrate control 80.

Inasmuch as the error $E_x = X_c - X_t$ is negative, this indicates that the controlled part must move in a negative X-direction.

Reference is now made to Table I. At the start of the first recirculation cycle, the number RR in remainder register 96x is positive five. Therefore $(L+E_m)$ is subtracted from RR in summer 97x to give minus five. The initial sign of RR being positive, will set memory 99x into a state indicative of the positive sign. Then $(L+E_m)$ is inserted as a negative number, minus ten. At the end of the recirculation cycle, the number in the remainder register is, minus five.

During the next recirculation cycle the constant $(L+E_m=10)$ is applied to adder 97x. This constant will be added inasmuch as the number in recirculation loop 98x is negative $(-5)$, so at the end of the second recirculation cycle, the number in the remainder register will be negative five plus ten, or plus five.

During the third recirculation cycle the error $E_x=-6$ will be entered into adder 95x which means that the number $R \pm E_x$ circulating into adder 97x will be minus one to which will be added minus ten. Thus the resultant number in the recirculation loop will be minus eleven. This

TABLE I

| Number of recirculation cycles | | RR, 5 | $R \pm E$ | $(R \pm E) \pm (L+E_m)$ | $E_x$, -6 | L, 4 | $(L+E_m)$ 10 |
|---|---|---|---|---|---|---|---|
| 1 | Start | 5 | 5 | 5−10=−5 | −6 | 4 | 10 |
|   | End | −5 | | | | | |
| 2 | Start | −5 | −5 | −5+10=+5 | −6 | 4 | 10 |
|   | End | 5 | | | | | |
| 3 | Start | 5 | 5−6=−1 | −1−10=−11 | −6 | 4 | 10 |
|   | End | −11 | | | | | |
| 4 | Start | −11 | −11 | −11+10=−1 | −6 | 4 | 10 |
|   | End | −1 | | | | | |
| 5 | Start | −1 | −1 | −1+9=8 | −5 | 4 | 9 |
|   | End | 8 | | | | | |
| 6 | Start | 8 | 8−5=3 | 3−9=−6 | −5 | 4 | 9 |
|   | End | −6 | | | | | |
| 7 | Start | −6 | −6 | −6+9=3 | −5 | 4 | 9 |
|   | End | 2 | | | | | |
| 8 | Start | 3 | 3 | 3−9=−6 | −5 | 4 | 9 |
|   | End | −7 | | | | | |
| 9 | Start | −6 | −6−5=−11 | −11+9=−2 | −5 | 4 | 9 |
|   | End | −4 | | | | | |
| 10 | Start | −2 | −2 | −2+9=7 | −4 | 4 | 8 |
|   | End | 7 | | | | | |
| 11 | Start | 7 | 7 | 7−8=−1 | −4 | 4 | 8 |
|   | End | −1 | | | | | |
| 12 | Start | −1 | −1−4=−5 | −5+8=3 | −4 | 4 | 8 |
|   | End | 3 | | | | | |
| 13 | Start | 3 | 3 | 3−8=−5 | −4 | 4 | 8 |
|   | End | −5 | | | | | |
| 14 | Start | −5 | −5 | −5+8=3 | −4 | 4 | 8 |
|   | End | 3 | | | | | |
| 15 | Start | 3 | 3−4=−1 | −1−8=−9 | −4 | 4 | 8 |
|   | End | −9 | | | | | |
| 16 | Start | −9 | −9 | −9+8=−1 | −4 | 4 | 8 |
|   | End | −1 | | | | | |
| 17 | Start | −1 | −1 | −1+8=7 | −3 | 4 | 7 |
|   | End | 7 | | | | | |
| 18 | Start | 7 | 7−3=4 | 4−7=−3 | −3 | 4 | 7 |
|   | End | −3 | | | | | |
| 19 | Start | −3 | −3 | −3+7=4 | −3 | 4 | 7 |
|   | End | 4 | | | | | |
| 20 | Start | 4 | 4 | 4−7=−3 | −3 | 4 | 7 |
|   | End | −3 | | | | | |
| 21 | Start | −3 | −3−3=−6 | −6+7=1 | −3 | 4 | 7 |
|   | End | 1 | | | | | |
| 22 | Start | 1 | 1 | 1−7=−6 | −3 | 4 | 7 |
|   | End | −6 | | | | | |
| 23 | Start | −6 | −6 | −6+7=1 | −3 | 4 | 7 |
|   | End | 1 | | | | | |
| 24 | Start | 1 | 1−3=−2 | −2−7=−9 | −3 | 4 | 7 |
|   | End | −9 | | | | | |
| 25 | Start | −9 | −9 | −9+7=−2 | −3 | 4 | 7 |
|   | End | −2 | | | | | |
| 26 | | −2 | −2 | −2+7=5 | −2 | 4 | 6 | then sets memory 99x to a state indicative of a minus number in loop 98x.

Then during the fourth recirculation cycle, the sum $(L+E_m)$ is added to the number RR and the result is $(-11+10=-1)$, which becomes the number RR.

During the fifth recirculation cycle, the memory 99x still indicates a negative number in recirculation loop 98x. Therefore $(L+E)$ is again added in adder 97x.

It will be noted that during the third and fourth recirculation cycles the number circulating in loop 98x is negative during both cycles. Accordingly, the quantity $L+E_m$ is added to RR during the fourth and fifth recirculation cycles. Either one of these conditions is detected by interpolation pulse detector 101x which supplies a command pulse to the X-axis servo system in response to such detection. The signs of the consecutive numbers RR will indicate the direction of motion of the part controlled by the X-axis servo system. In this case the two consecutive negative numbers during the third and fourth recirculation cycles signal that a command pulse be produced for movement of the controlled part along the X-axis in the negative direction.

With the foregoing explanation of operation through the fifth recirculation cycle, the operation through the remaining cycles may be easily understood.

As previously pointed out, the pulses or counts applied to bidirectional counter 81 from the interpolation pulse detectors are decrementing counts, and are applied through function gate 88 over lines G, M and S in the rai of 2.5, 1, and .75; which are the coefficients of Equation II.

It may be seen that the rate at which the command pulses are applied to the servo system is proportional to the existing error between the interpolated position $X_t$ and the command position $X_c$, as well as the feedrate pulse frequency.

From Table I, it is seen that command pulses will be iterated at the fourth, ninth, sixteenth and twenty-fifth recirculation cycles.

In this example $E_x = E_m$. Therefore, in the other axes interpolators $E_m \ne E_y$ or $E_z$, and command pulses would be iterated less frequently, but at a rate dependent on the magnitude of the existing position errors.

While the movement of the controlled parts along each axis is synchronized by the feedrate control network and theerfore the feedrate pulses $f_p$, the rate of movement of a controlled part along its axis relative to the other parts along their axes is determined by the magnitude of the existing position errors.

It is to be understood that in the foregoing example, for purposes of discussion, the error gate 94x has been assumed to be opened an average of every third recirculation cycle. However, the error gate may be opened more frequently or less frequently as determined by the feedrate control 80.

In the foregoing example, assume that the error $E_m$ is the X-axis error $E_x$, then the rate at which the X-axis IPD iterates command pulses is proportional to $$\frac{E_m+L}{E_x}$$

Similarly, the production of Y and Z command pulses is proportional to $$\frac{E_y}{E_m+L} \text{ and } \frac{E_z}{E_m+L}$$

respectively.

Thus all command pulse production rates are proportional to the same quantity, $E_m+L$, or alternatively stated, all may be stated as fractional quantities having the same denominator. Accordingly, the relative rates of the controlled parts are proportional to the existing axes position errors. Therefore, the rates of movement of the controlled parts are synchronized to define the desired linear path.

As the error approaches zero, the feedrate of the parts will decrease also so that the path defined by the relative motion of all machine tool parts will accurately terminate at the commanded end point. This may be mathematically demonstrated by consideration of X-axis interpolation. This recirculation loop is, in essence, a digital differential analyzer.

In a digital differential analyzer $$f_o = f_a \frac{N}{C} \quad (V)$$

where $f_o$ = overflow frequency (equivalent to command pulse production)
$f_a$ = rate of addition (opening of error gate)
$N$ = number added then $$N = E_x,$$

where $E_m$ is the largest error, $$C = L + E_m$$

where

L is the add constant in adder 100 then $$f_o = f_a \frac{E_x}{E_m + L} \quad (V)$$

Near the end point, when bidirectional counter 81 is saturated, iteration memory 87 opens the error gates every recirculation cycle, the rate of application of command pulses to the servo systems becomes dependent only on the quantity $$\frac{E}{E_m + L}$$

As the end point or commanded position $X_c$ is approached $E_m$ approaches zero and $f_o$ approaches $O/L$. Thus no more command pulses are produced and the controlled parts accurately stop at the commanded end point.

Figure 5:
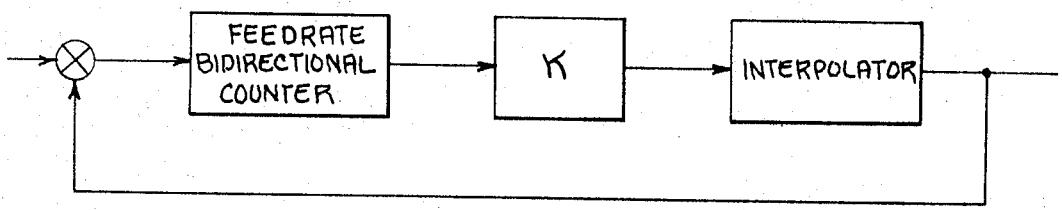
FIG. 5 is a diagram in block form of interpolation systems embodying the invention arranged for linear interpolation.

The feedrate control together with the interpolators comprise a closed loop system in which bidirectional counter 81 acts as a comparator. As shown in FIG. 5, incrementing $f_p$ pulses are applied to counter 81, as are the decrementing command pulses $f_c$. The function K represents the iterations gates.

Initially as $f_p$ pulses are applied the count in counter 81 builds up at a rate proportional to the programmed feedrate as the feedrate may be modified by feedrate adjust control 66. Then as the controlled parts commence movement, decrementing command pulses are applied and an essentially steady state condition is reached which provides an essentially constant rate of opening of the interpolator error gates. As the axes errors decrease when the controlled points approach their commanded end points produced, the counter becomes numerically saturated. Then the rate of produced command pulses is dependent only on $L+E_m$ and the error for each axis.

Reference is now made to FIG. 7 which illustrates further the servo system 33 for one axis, the X-axis, in conjunction with position register 51 and instantaneous command register 54. This arrangement is adapted to supply an interpolated position signal. The signal $X_t$ represents the instantaneous commanded position of the controlled part.

Servo system 33 comprises a bidirectional counter 104, a number to frequency converter 105, an amplifier 106 and a prime mover 107. A numerical count in bidirectional counter 104 is converted to a frequency in number-to-frequency converter 105. This frequency is applied to an amplifier 106 which may comprise a hydraulic valve which controls flow of hydraulic fluid to a hydraulic motor. A pulse responsive servo system of this type is disclosed in co-pending application Ser. No. 349,216, filed Mar. 4, 1964, of Johann F. Reuteler.

As machine part 22 is moved by the X-axis prime mover 107, the quantizer 47 generates pulses each indicative of an incremental motion a degree of movement of part 22. These pulses or counts are applied to position register 51 during each recirculation cycle through summers in the form of bidirectional adders 108 including an overflow stage 109 which add these counts to the actual position of part 22. The actual position is expressed in binary form in position register 51. Quantizer 47 also applies pulses to bidirectional counter 104 of servo system 33. In the portion of the servo system thus far described, the command pulse from the X-axis IPD 101x are applied to bidirectional counter 104 (FIG. 7) of servo system 33 over line 110 through a multiplier 111 which multiplies the command pulses by a factor of two. This multiplication may or may not be included dependent upon the weight of each pulse from quantizer 47. The function of pulse multiplier 111 is to equalize the weight of the command pulses with the quantizer pulses. The command pulses will either increment or decrement counter 104. The quantizer pulses will either increment or decrement the counter in an opposite manner with respect to the command pulses and thereby provide negative feedback. The resulting number held in the bidirectional counter 104 represents a velocity error, and number-to-frequency converter 105 generates a pulse train having a repetition rate proportional to the existing error. The pulses of this pulse train are applied to amplifier 106.

Instantaneous command register 54 is illustrated as a portion of a sixteen-position recirculating register. Five positions are utilized for each axis. Thus, once each recirculation cycle all numbers will be in their proper position. The produced command pulses from each axis interpolation pulse detector are applied to one-stage bidirectional adders 112x, 112y and 112z. However, only the X portion of the instantaneous command register need be discussed.

At the start of a commanded movement the numerical count of the five places of the X portion of the instantaneous command register will agree with the five least significant bits in position register 51. However as command pulses are iterated from interpolation pulse detector 101x to command incremental movement for each pulse through the servo system, the controlled part will not instantaneously move upon production of the command pulse due to inherent time delays in the system, servo system, response and inherent lags through the system. Accordingly, the instantaneous command register is provided to indicate the interpolated position of the part or, alternatively, the position of the part if the total response of the system was immediate to each iterated command pulse.

It will be apparent that an instantaneous command register in the form of an independent register having sixteen stages, could be provided for each axis. However, for purposes of economy it may be expedient for the three axes to share one sixteen-stage register each axis utilizing five stages. In this arrangement each axis section of the instantaneous command register accumulates a number indicative of the five least significant bits of the command position. As the produced command pulses are received from interpolation pulse detector 101x they are applied to a one-stage bidirectional adder 112 which holds one bit. The numerical counts in the interpolator networks each have a value of 0.0005". Then, upon reception of two iterated command pulses a count is applied to stage 113x of register 54. This count then has a weight of .001" and is consistent with the weight of each count in position register 51. Such count may be added each recirculation cycle to stage 113 which is a bidirectional adder. The last bit of the X axis portion of the instantaneous command register is so arranged that an X count will not carry to the Y portion of the instantaneous command register. Each recirculation cycle the contents of the X portion of instantaneous command register 54 including any count that may be received from adder 112 are applied to a so-called "unite circuit" 114, as exemplified through a switch 115. During each recirculation cycle, the bits in the five stages of instantaneous command register occupied by the X axis data is accepted by unite circuit 114. Thereafter, the switch 115 is moved to its other terminal and the contents of the position register less the five least significant bits are annexed to the contents of the instantaneous command register.

Also, as hereinafter more fully described, the numerical content of the position register is sampled to determine if the most signficant bits should be modified. For example, in a few instances the numerical data in the position register might have a numerical value such as 99,999 while the numerical count in the X five bits of the instantaneous command register might total a numerical value of 23. If the instantaneous command data were then substituted for the five least significant bits of the position register, the error between the thus far commanded position and the actual position would be compounded. Therefore, the unite circuit contains means to change the 99,999 to 100,023 which then would be the true interpolated position.

It will be apparent that if the position register contained the numerical sum of 99,999 and the instantaneous command register stated that the five least significant bits of the interpolated position should indicate a numerical value of 23, that the true interpolated position would be 100,023. Accordingly, the unite circuit is arranged to sense these conditions and modify the more significant bits in the position register as they are passed through the unite circuit to indicate the true interpolated position.

In the example given above, it would be apparent that the lag of the actual position behind the interpolated position is represented by a numerical count of twenty-four.

To determine this lag, a lag network is provided which comprises a lag subtractor 116 which receives the content of instantaneous command register every recirculation cycle and also the five least significant bits of position register 51 each recirculation cycle. Lag subtractor 116 subtracts the five bits of the instantaneous command register 54 from the five least significant bits of the position register to provide a numerical count which is indicative of the actual position lag of the controlled part 22 behind the interpolated position. This lag count is applied to a lag register 117 similar in construction to instantaneous command register 104 in that it is shared by the lag number for each axis. The output of the lag subtractor 116 is a binary number having four numerical bits and a sign bit. The four numerical bits are shifted to the second through fifth stages of lag register 117x and algebraically added to the output of lag subtractor 116. Added to the first stage of the lag register each recirculation cycle, when present, is a command pulse from adder 112x which has not been scaled. Thus, as the lag number is repetitively added to itself each recirculation cycle, there would tend to be an overflow from the highest order stage 117a at the end of each recirculation cycle. The existence of this overflow bit in the lag stage 117a produces a one-pulse or count into the servo system over line 118.

It may be seen that this repetitive adding of the X lag signal and the resultant detection of overflow and application of the potential overflow pulse to the bidirectional counter 104, in effect, comprises a form of a digital differential analyzer. Therefore, the lag subtractor in conjunction with the lag register provides a lag signal to the servo system which is proportional to the actual lag of the controlled part 22 behind the interpolated position as denoted by the numerical value of $X_t$. The repetition of the lag signal to the servo system will be proportional to the magnitude of the lag.

This lag is inherent in the servo system. The lag signal in effect tells the servo to control the velocity of the controlled part so that the velocity is proportional to the lag. The lag is a measure of the error between the instantaneous commanded position and the actual position and therefor is constant when the velocity of the controlled part is constant. The lag network including the position register comprises a position loop in the overall servo system and provides a lag or position correction signal. These correction signals for each axis help in maintaining synchronization of movement of all of the parts.

It will be understood that as the controlled part approaches its end point and the velocity of the controlled part commences to decrease, as shown in Equation IV, the actual lag of the slide behind the interpolated position will decrease toward zero. Hence, the overflow of the lag register or the rate of overflow of the lag register will decrease towards zero. Therefore, the lag network will supply no undesired impetus in the form of command pulses to the servo system. The signal from lag register $117x$ is referred to as a lag signal in that it controls the actual lag of the controlled part behind the interpolated position and keeps the actual position lag along each axis proportional to the velocity along that axis.

In circular interpolation, the machine parts are moved to define the path of an arc AR in two axes as shown in FIG. 2, and as further shown in FIG. 9 between the points P and C. At the start of a circular interpolation operation, the machine system knows its own position P by virtue of the coordinates in the axes position registers and the partial coordinates in the ICR's. The commanded point C is fed in from the tape reader to the portion of the circuit previously described. In operation, in circular interpolation, two or more parts will move along two axes to define the arc between the points P and C.

As the parts move along their respective axes to define the arc PC, the actual position and interpolated position are continuously recorded in the position registers and ICR's respectively, for the individual axes.

The information which is read into the system from the tape during circular interpolation is the coordinates of the end points which are read into the X and Y command registers, and the coordinates of the center point M which are read into the Z and R command registers.

With reference to FIG. 8a, it may be seen that vectorially $$V = A + E \qquad \text{(VI)}$$

It may further be seen that $$A = E^2/2h \qquad \text{(VII)}$$

and for each or any position along the arc PC $$Ax = \pm E_y E / 2h \qquad \text{(VIII)}$$

and $$Ay = \pm E_x E / 2h \qquad \text{(IX)}$$

With reference to FIGS. 8b and 8c it will be seen that as the arc PC is defined by relative movement of the parts, the vector V decreases as does the vector A. Accordingly, the vector E, which is the instantaneous chord between the interpolated position and commanded position decreases in accordance with the vector equation. It may further be noted that as the error vector E decreases corresponding to a decrease in arc length the perpendicular thereto from the center M increases. This logical relationship is utilized in accomplishing circular interpolation. In the circular interpolation system it will be noted that the shortest and most immediate distance from the point P to the point C is along the error vector E. The system generally operates on this error. However, additional information indicative of the arc intercepted by the slope of the line to the starting point and the commanded position and the radius of the arc is utilized to control movement along the arc PC. This additional information which is given by the quantity $E/2h$ is superimposed or algebraically added to the point-to-point intelligence and the movement along an arc between the points P and C which are defined by a radius and the cord E thereof. As will hereinafter be made apparent, the quantity $E/2h$ is represented by $E_x/2h_y$ or $E_y/2h_x$.

A further consideration in the arc path movement during circular interpolation is the change in velocity of the coordinate velocity vectors. Reference to FIG. 9 will indicate this change. The velocity vector V at point P has coordinate components $V_x$ and $V_y$, where $V_y$ is substantially greater than $V_x$. As the path is further defined to point $T_1$ which is substantially forty-five degrees, the coordinate components $V_x$ and $V_y$ are substantially equal and continuing along the arc to point $T_2$ the velocity vector $V_x$ component is now substantially greater than the velocity is now substantially greater than the velocity vector $V_y$.

The structure and operation of the interpolation network during circular interpolation and the couplings thereof are exemplified in block form in FIG. 10, where like elements to those shown in FIGS. 6 and 7 bear like identifying numerals.

During circular interpolation the coordinates of the center point M of the arc are introduced into the Z and R command registers, FIG. 3. These are the X and Y coordinates of the point M. These coordinates are applied to subtractors 120 and 121 together with the interpolated position information $X_t$ and $Y_t$, respectively.

In circular interpolation operation, recirculating loops $60x$ and $60y$ of the X and Y interpolation systems operate substantially as previously described, with the exception that at times the X axis error $E_x$ is applied to the Y axis error gate $94y$ and the Y axis error $E_y$ is applied to the X axis error gate $94x$ in signs determined by the commanded direction of rotation. The adding networks $95x$ and $95y$, as exemplified in FIG. 11 are also operative to act as subtractors when conditioned by a signal TG from translator 40 to signify the direction, clockwise or counterclockwise of motion.

The X coordinate of the point M is applied to a subtractor 120 and the interpolated position $X_t$ from the X-axis unite circuit is subtracted therefrom. Similarly, the Y coordinate of the point M is applied to a subtractor 121 and the interpolated position $Y_t$ from the Y unite circuit is subtracted therefrom. The absolute values of the resulting subtractions $R_x$ and $R_y$ as indicated by the blocks 122 and 123, respectively, are applied to a magnitude comparator 124 which determines the coordinate of the radius vector R from the point M to the interpolated position $P_1$ (FIG. 9) which has the greater magnitude. This information tells which radius vector is the larger and, therefore, it may be seen by reference to FIG. 9 that when the X coordinate of the radius vector is greater than the Y coordinate thereof, the Y coordinate $V_y$ of the velocity vector V will be greater than the X coordinate $V_x$ thereof. In response to the magnitude comparator 124 sensing the larger of the two values $R_y$ and $R_x$ the magnitude comparator 124 applies a signal to function gate 88. Function gate 88 receives command pulses from interpolation pulse detectors $101x$ and $101y$ and in response to the signal from magnitude comparator 124 will connect the produced command pulses to the appropriate stages in bidirectional counter 81 as heretofore described.

As previously described, the feedrate control through iteration memory 87 will periodically open error gates $94x$ and $94y$ to introduce the position errors into recirculation loops $60x$ and $60y$ and produce iteration of a command pulse from the interpolation pulse detectors.

The relation of the vectors E and h (FIG. 9) is such that when $E_x > E_y$ $$2h_y = 2(M_y - T_y) - E_y \qquad (X)$$

and when $V_y > V_x$ $$2h_x = 2(M_x - T_x) - E_x \qquad (XI)$$

where $M_y - T_y = R_y$, and
$M_x - T_x = R_x$

Thus the quantity $2h$ may be determined from the comparison of $E_x$ and $E_y$. A gating or switching device 125 is provided which connects the appropriate ones of $E_x$, $E_y$, $R_x$ and $R_y$ to subtractor 126. If magnitude comparator 93 determines $E_x > E_y$, then switch 125 is set to satisfy Equation (X) in subtractor 126 and D $(2h)$ indicated in block 127 is equal to $2h_y$. When $E_y > E_x$, the switching function of gate 125 is reversed to satisfy Equation XI in subtractor 126.

To determine the quantity $2h_n$, the smaller component of the absolute value of the largest coordinate error $E_m$ is subtracted from the quantity $R_x$ or $R_y$ in subtractor 126. The quantity $2h_n$ represents the coordinate value of $2h$ perpendicular to the larger of the E coordinates. The subtractor 126 subtracts the coordinate $E_m$ from twice the value of the opposite coordinate of the radius vector $[(M-T)_n = R_x \text{ or } R_y]$. The result of this subtraction yields the quantity $2h_n$, or more specifically, twice the coordinate value of $h_n$ which is perpendicular to the larger error coordinate $E_m$.

Attention is now directed to a recirculation loop 130 which contains a remainder register 131 which may be the Z-axis remainder register. A shift stage 132, a one-stage adder 133 and a one-stage subtractor 134. The subtractor 134 receives as an input the larger $E_m$ of the axis errors $E_x$ or $E_y$ from one of subtractors 89x or 89y through magnitude comparator 93. Adder 133 receives as an input the absolute magnitude of the quantity $2h_n$ from subtractor 126. The number in remainder register 131 may circulate through stage 132 when switch 135 is closed to terminal 136, which effectively bypasses the adder 133 and subtractor 134. Switch 135 is closed to terminal 137 by iteration memory 87 when set. When iteration memory 87 is set, the number in remainder register 131 will have $E_m$ subtracted therefrom or $2h_n$ added thereto dependent upon the setting of a switch 138. Switch 138 is set by a sign memory 141, which senses the sign of the number in loop 130. When such sign is positive, switch 138 is at terminal 139 and remains there until $E_m$ is subtracted from the number in loop 130 a sufficient number of times to make such number negative.

Then sign memory 141 senses the sign of the negative number in loop 130 and sets switch 138 to terminal 140. When the sign is positive switch 138 places adder 133 in loop 130. The condition of memory 141 (set or reset) corresponding to the sign of the number in loop 130 operates a double throw switching network 142 which receives the errors $E_x$ and $E_y$ and routes these signals to appropriate error gates, as hereinafter described.

If sign memory 141 is set to indicate a positive number network 142 routes $E_x$ and $E_y$ to error gates 94x and 94y respectively. However, when sign memory 141 is set to indicate a negative number, network 142 routes $E_x$ to error gate 94y and $E_y$ to error gate 94x.

During a linear interpolation function and during a circular interpolation function where network 142 does not cross connect the errors, $E_x$ and $E_y$ are added algebraically to loops 98x and 98y by summing circuits 95x and 95y, respectively. However, when network 142 cross-connects the errors $E_x$ and $E_y$ to error gates 94y and 94x, respectively, these errors are algebraically added in one of circuits 95x or 95y and algebraically subtracted in the other dependent upon the direction of rotation. Thus, if $E_y$ is added in circuit 95x, $E_x$ is subtracted in circuit 95y. The circuits 95x and 95y are conditioned for such an addition or subtraction function by a signal TG from translator 40, FIG. 3, which derives this intelligence from tape 37.

In the example shown in FIG. 9, the error $E_x$ is always greater than $E_y$. Accordingly, the equation satisfied by subtractor 126 will be $$2h_y = 2(M_y - T_y) - E_y$$

It may be seen that as $E_x$ decreases $h_y$ increases. Therefore, as the angle between the interpolated position and point C as shown in FIG. 8c decreases, sign memory 141 will predominantly be set to indicate a positive number in loop 130. Thus $E_x$ will be added to the number in loop 98x and $E_y$ will be added to the number in loop 98y.

With these relationships, it will be apparent that the rate of change of sign of the number in loop 130 is proportional to the relative position of the controlled part along the arc PC. For example, if $E_m$ and $2h_n$ are substantially equal the sign of the number in loop 130 will change almost every recirculation cycle in which an iteration occurs. However, if $2h_n$ is substantially larger than $E_m$, as exemplified between points $T_2$ and C, $E_m$ will be subtracted each recirculation cycle in which an iteration occurs until the number becomes negative. Then $2h_n$ will be added and again many subtractions of $E_m$ will be required to reduce the number in loop 130 to a negative value.

Thus the ratio of the number of consecutive recirculation cycles that memory 139 is set in a particular state to the number of recirculation cycles in which an iteration occurs it is set in the other state represents the relative values of the components of $h$ and E.

With reference to FIG. 8c it will be seen that $2h_y$ is substantially greater than $E_x$ by a ratio of approximately thirteen to one. Assuming that the number in recirculation loop 130 is approximately zero and at point $P_2$ the quantity $2h$ is added in adder 133, then sign memory 141 will detect this positive sign of the number in loop 130 and set switch 138 to terminal 139. At this time it will require approximately thirteen recirculaiton cycles in which iteration occurs for $-E_x$ to decrement the number in remainder register 131 to a negative number. During these approximately thirteen recirculation cycles the errors $E_x$ and $E_y$ are algebraically added in the summing networks 98x and 98y, respectively, in the same manner as they would be if the system was operating under linear interpolation. However, when $E_x$ has been subtracted from the number in the remainder register 131 approximately thirteen times, the number in remainder register 131 will become negative in sign. Sign memory 141 now senses the negative sign of the number in loop 130 and sets switch 138 to terminal 140. During the next recirculation cycle in which iteration memory 87 is set, the quantity $2h_y$ is added. Sign memory 141 being set in a condition indicative of a positive number in loop 130 conditions switch network 142 to apply the error $E_x$ to summing network 98y and the error $E_y$ to summing network 98x.

Thereafter sign memory resets switch 138 to terminal 139 and for the next approximately thirteen recirulation cycles will sense a positive number in loop 130 and condition switch network 142 to apply the error $E_x$ to summing circuit 98x and $E_y$ to summing circuit 98y.

It may thus be seen that the ratio of the times during which the errors are directly connected to the interpolation networks or cross-connected is a function of the quantity $E/_{2h}$.

In this manner the direction of motion of the controlled parts is controlled to define a path along arc PC, (FIG. 9) for the cutting tool.

Preferably, the disclosed system utilizes recirculating registers and techniques. In such a system the operation is synchronized by clock signals which occur each clock cycle. Four clock signals which our each clock cycle are shown in FIG. 11. These clock waveforms assume two levels designed as zero (low) and one (high), as shown in FIG. 11. These clock waveforms are derived from clock oscillator 64 which may be the type disclosed in copending application of Johann Reuteler, Ser. No. 349,216, filed May 5, 1964. In some instances other reoccurring signals, termed markers, are utilized.

FIG. 12 graphically represents the timing of the marker signals in their relation to the clock cycles. Each marker signal has a high duration of one clock cycle. In FIG. 12 the clock cycles are illustrated only through four clock cycles. The clock cycles may be designated as M0 through M15, when sixteen position registers are utilized. Markers M0 commences one-quarter of a clock cycle before clock cycle 0 and ends one-quarter of a clock cycle prior to termination of clock 0.

Markers M1 and M1' commence one-quarter cycle before and one-quarter cycle after initiation of clock cycle one, respectively, and terminate in the same relationship to clock cycle two. Similarly, markers M2 and M2' have a duration of one clock cycle and start one-quarter clock cycle before clock cycle 2 and one-quarter cycle after clock cycle 2, respectively. Any other marker signals M3 and M3' through M15 and M15', respectively, bear the same relations to succeeding clock cycles. Inverted marker signals may also be utilized and are designated as $\overline{M}$.

The logic circuits are generally comprised of so-called NOR logic circuitry using elements such as transistors which will provide a "0" level output when there is a "1" level input and will provide a "1" level output when there is "0" level or no input. Such NOR circuits may be used as gates, inverters or amplifiers as shown in FIG. 13a and may also be cross-connected to form bi-stable multivibrators or flip-flops as shown in FIG. 14a, which are referred to herein as memories.

Figure 13A:
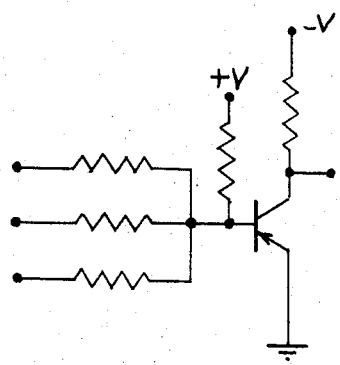
Figure 14A:
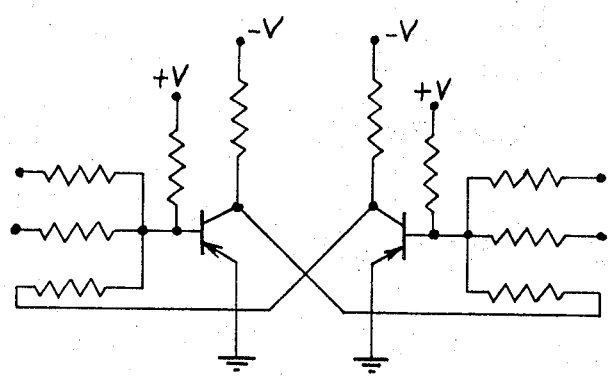
Figure 13B:
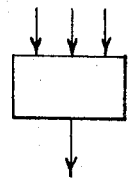
Figure 14B:
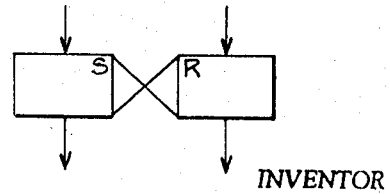

In the drawings the NOR circuits of FIG. 13a are illustrated as shown in FIG. 13b. The memories as shown in FIG. 14a are illustrated as shown in FIG. 14b. The letters "S" and "R" designate the set and reset sides of the memories.

Figure 15:
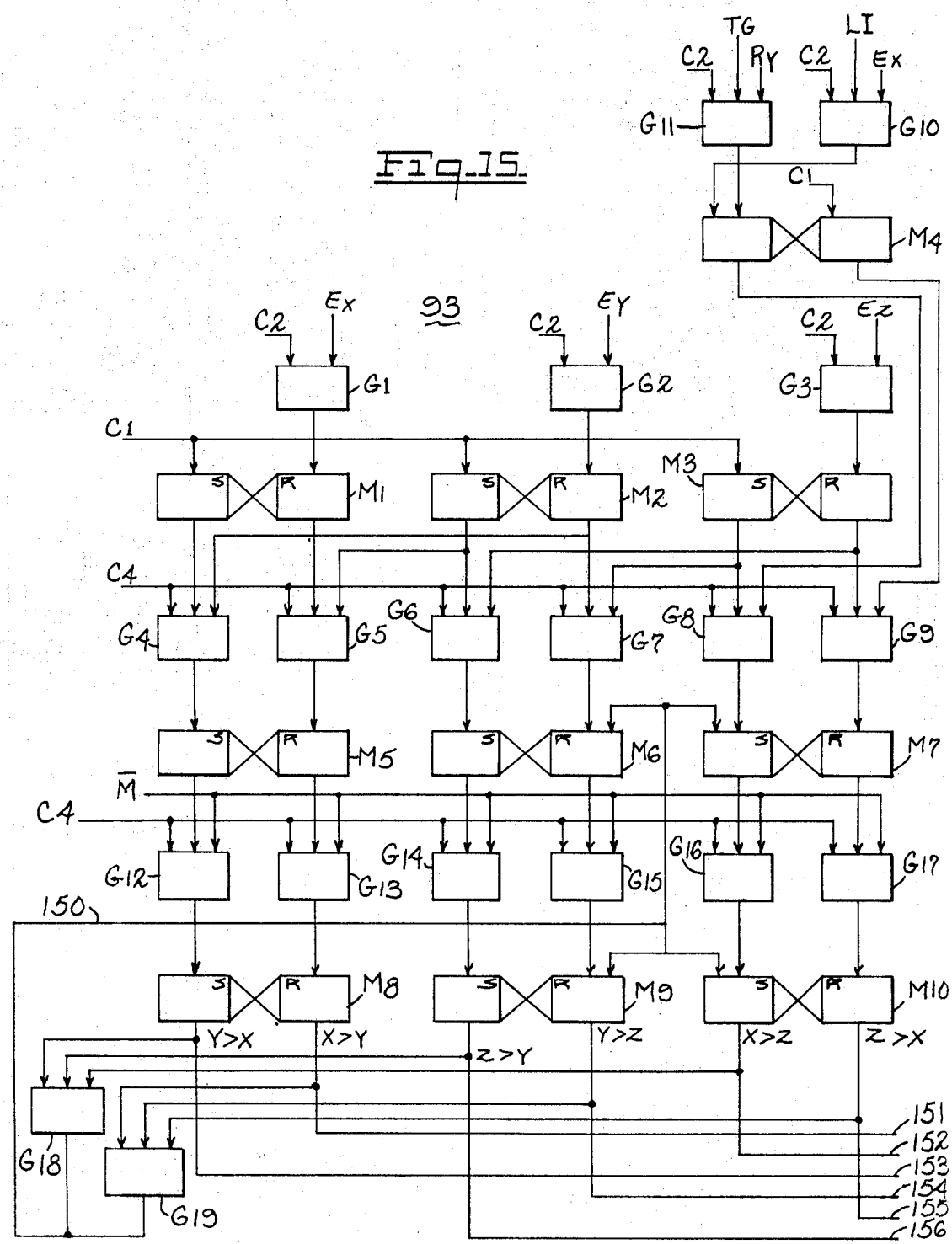
Figure 15:
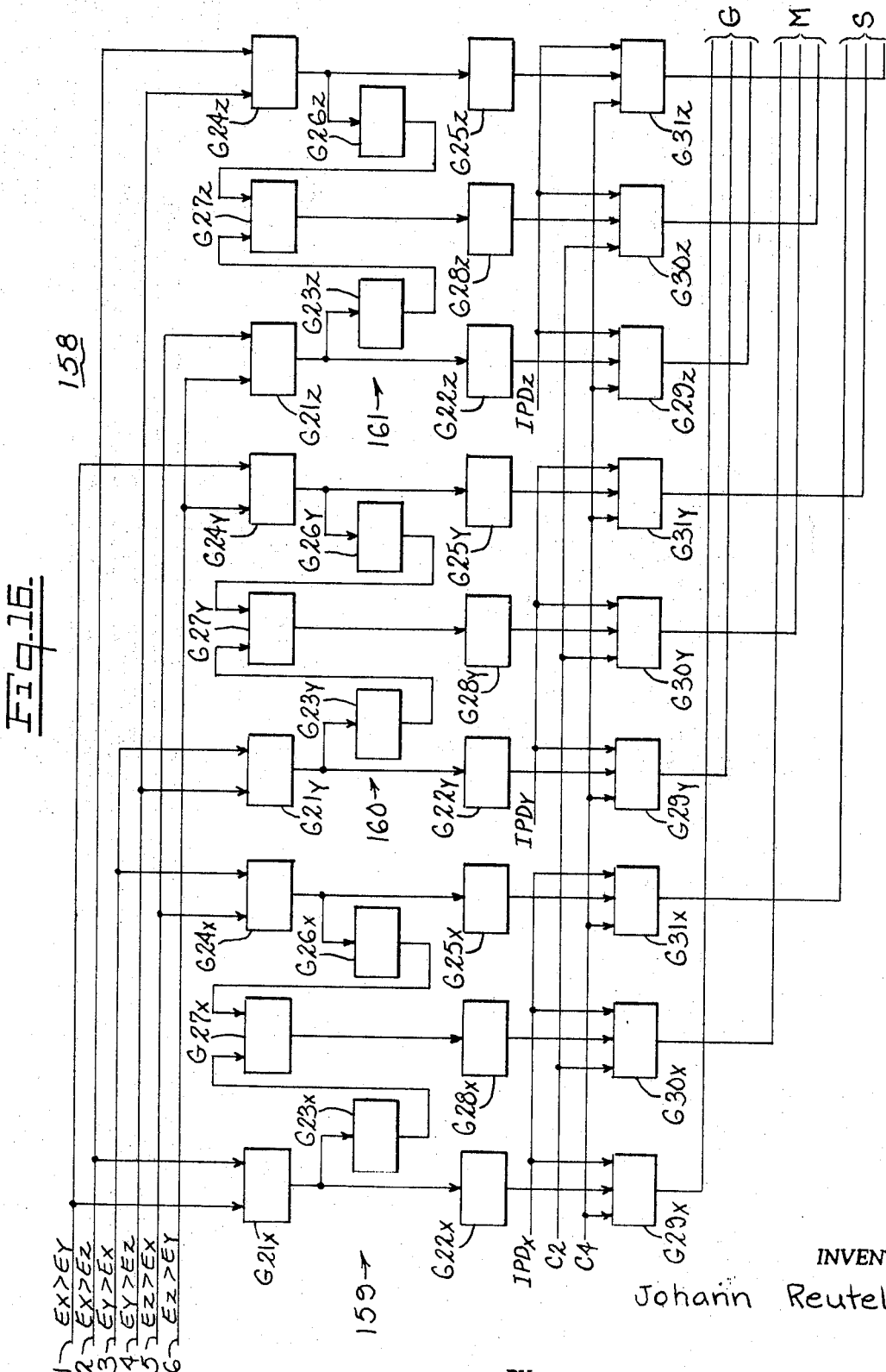

Error magnitude comparator 93 is illustrated in FIG. 15. The bits of each error $E_x$, $E_y$ and $E_z$ are applied least significant bit first in absolute magnitude to one of three channels, respectively, of the error magnitude comparator. The error having the highest order "1" bit and the relations of the magnitudes of the errors are determined therefrom. Error magnitude comparator 93 is further modified during circular interpolation to include error magnitude comparator 124. The errors $E_x$, $E_y$ and $E_z$ are applied to gates G1, G2 and G3, respectively. A "1" bit is represented by a low level or zero signal input at clock C2. At clock C2 if error "1" bits are present in all of $E_x$, $E_y$ and $E_z$ all of the gates G1, G2 and G3 will have high outputs. The outputs, if any, of gates G1, G2 and G3 are applied to memories M1, M2 and M3, respectively, as resetting signals, at clock C2 just after such memories have received a setting signal from clock C1. A reset condition of any memories M1, M2 or M3 indicates a binary "1" digit. Gates G4 and G5 receive inputs from each side of memory M1, a clock pulse C4 and inputs from each side of memory M2. Gates G6 and G7 receive inputs from memory M2, clock C4 and from memory M3. Gates G8 and G9 receive inputs from memory M3, clock C4 and also inputs from a memory M4. During linear interpolation memory M4 will be in the same condition as memory M1. Memory M4 receives inputs from a gate G10 which receives as inputs the error $E_x$, clock C2 and a signal LI from the tape reader which is low (zero) when the linear interpolation mode of operation is called for. Thus, the error $E_x$ at clock C2 may reset memory M4 which is set at C1. The outputs of memory M4 are connected to gates G8 and G9. At this point it may be seen that the gates G4 and G5 will initiate comparison of X and Y signals, the gates G6 and G7 will initiate comparison of Y and Z signals and the gates G8 and G9 will initiate comparison of X and Z signals. Each of gates G4, G5; G6 G7; and G8, G9 apply outputs to opposite sides of memories M5, M6 and M7, respectively. Assume that during a given bit in the comparison (recirculation) cycle, memory M1 has been reset at clock C2 through gate G1. This will cause the output of the right side of memory M1 to go low (zero). If the output of the left side of memory M2 is also low at C4, gate G5 will reset memory M5. This indicates that at that particular time in the recirculation cycle a "1" bit existed in the error $E_x$ and a "0" bit existed in the Y error.

Assume when the next bit of each number is applied to gates G1 and G2 that a "1" bit was present in $E_y$ and was not present $E_x$. Then memory M1 would be reset, but memory M2 would not be reset. Therefore, at C4 all of the inputs into gate G5 would be "0," gate G5 would have a "1" output and memory M5 would be reset. This would indicate for the portion of the number thus far compared that $E_y$ was greater than $E_x$. When once placed in a set or reset condition, memory M5 and also memories M6 and M7 will remain that way unless there is a change in the compared values of the error signals as the error comparison progresses bit by bit.

Accordingly, it may be seen that with respect to the errors $E_x$ and $E_y$ the state of M5 will indicate for each compared bit which error is largest. When a binary position of two errors being compared is the same, there will be no change in the previous state of the associated one of memories M5, M6 or M7. Following the comparison of the most significant bits of $E_x$ and $E_y$ a marker $\overline{M}$ opens gates G12–G17 to copy the content of memories M5–M7 into memories M8–M10, respectively. For the remainder of a recirculation cycle memories M8–M10 will not be affected since gates G12–G17 are open for only one clock cycle by marker $\overline{M}$. The state of the memory M8, M9 and M10 depending upon their condition will indicate various intelligence as to the relative size of the errors $E_x$, $E_y$ and $E_z$ as indicated below memories M8, M9 and M10. The side of the memories having the high output indicates the relative magnitude of the compared errors. Thus, if memory M8 is set $E_x$ is greater than $E_y$.

Under certain conditions, the defined path could be forty-five degrees originating from the center of the coordinate system. In such case, all position errors would be equal and the magnitude comparator network 93 as thus far described could make no distinction therebetween. However, it will be recalled that a relationship of the three errors is required for the inputs G, M and S to the feedrate control counter 81. Accordingly, means are provided in the form of gates G18 and G19 to sense such equality. If all inputs to gates G18 or G19 are zero, gates G18 or G19 over line 150 will set memories M7 and M10 to indicate that $E_z$ and $E_x$ are not equal and $E_x > E_z$; and resets memories M6 and M9 to force an indication of inequality in the comparison of $E_z$ and $E_y$.

It may be seen that the magnitude comparator 93 generally comprises three symmetrical circuits. During linear interpolation the three circuits are required to make the three comparisons. However, during circular interpolation only two of these networks are needed to compare $E_x$ and $E_y$ and the radius vectors $R_x$ and $R_y$. In the circular interpolation mode, gate G10 is disabled by the signal LI and Gate G11 is enabled by the signal TG. Then the radius vector $R_y$ is applied by gate G11. Simultaneously, the radius vector $R_x$ is applied over the $E_z$ input to gate G3. Therefore, $R_x$ and $R_y$ are compared in the right-hand side of the network and $E_x$ tnd $E_y$ are compared only in the left-hand side of the network.

When the magnitude comparison is made and the relative magnitudes of the errors are determined, the greatest, median and smallest error is determined. From the explanation of FIG. 15 it is clear that when M8 is set $E_x > E_y$
M8 is reset $E_y > E_x$
M9 is set $E_y > E_z$
M9 is reset $E_z > E_y$
M10 is set $E_z > E_x$
M10 is reset $E_x > E_z$ Line 151–156 convey the intelligence of the error magnitude comparison to a network for determining the relative values of the errors. The lines 151–156 are each applied to inversion gates (not shown) to invert the signal thereon. For example, if memory M8 is set to indicate that $E_x$ is greater than $E_y$, the signal on line 151 is high. The associated inversion gate inverts this to a low signal before application to the network of FIG. 16.

In FIG. 16 lines 151–156 bear the noted intelligence regarding the relative magnitude of the errors. The signal on the lines is low when the noted condition is present. This error determination network 158 comprises three sections, 159, 160 and 161, each of the sections being associated with one axis. The three sections are identical in construction and elements thereof bear like identifying numerals with appropriate differentiating letter suffixes.

In section 159 which comprises a plurality of coincidence and inversion gates, gate G21x receives inputs from lines 151 and 152. When both of these lines are low gate G21x senses that the error $E_x$ is greater than both $E_y$ and $E_z$ and gate G21x has a high output which is inverted by gates G22x and G23x. Conversely, gate G24x receives inputs from lines 153 and 155. When both of these lines are low, gate G24x senses that the error $E_x$ is less than both of $E_y$ and $E_z$ and has a high output which is inverted by gates G25x and G26x. Gate G27x is arranged to sense the condition when $E_x$ is neither the largest error nor the smallest error. When such condition is sensed this, of course, indicates that $E_x$ is the median error. If gate G27x senses that neither gate G21x or G24x has a high level output through the inversion gates G23x and G26x, gate G27x then has a high level output which indicates that the error $E_x$ is the mean error. The high level output of gate G27x is then inverted at gate G28x. The inverted output of gates G21x, G27x and G24x is applied as an enabling or disabling signal to gates G29x, G30x and G31x, respectively. If $E_x$ is the greatest error, gate G29x will be opened by gate G22x. If not, gate G29x will be disabled. Similarly, if $E_x$ is the median error gate G30x will be opened by gate G28x. If $E_x$ is the smallest error, gate G31x will be opened by gate G25x. The command pulses from the X axis IPD 101x are applied to all of gates G29x, G30x and G31x and such pulses will be gated through the opened one of these gates. In the same manner, the command pulses from the Y axis IPD $101_y$ are applied to gates G29y, G30y and G31y and the Z axis command pulses from IPD $101_z$ are applied to gates G29z, G30z and G31z.

The outputs of gates G29x, G29y and G29z are grouped as indicated by the reference letter G. The outputs of gates G30x, G30y and G30z are grouped as indicated by the reference letter M and the outputs of gates G31x, G31y and G31z are grouped as indicated by the reference letter S. These groups are carried to function gate 88 set forth in FIG. 17.

During circular interpolation, memory M8, FIG. 15, directly selects the position of switch 125, FIG. 10, to determine which of $R_x$ and $R_y$ is applied to subtractor 126. Memory M10 which compares $R_y$ and $R_x$ directly determines the connections of $IPD_x$ and $IPD_y$ through function gate 88 to feedrate counter 81. In this mode of operation the network of FIG. 16 is not utilized.

Figure 17:
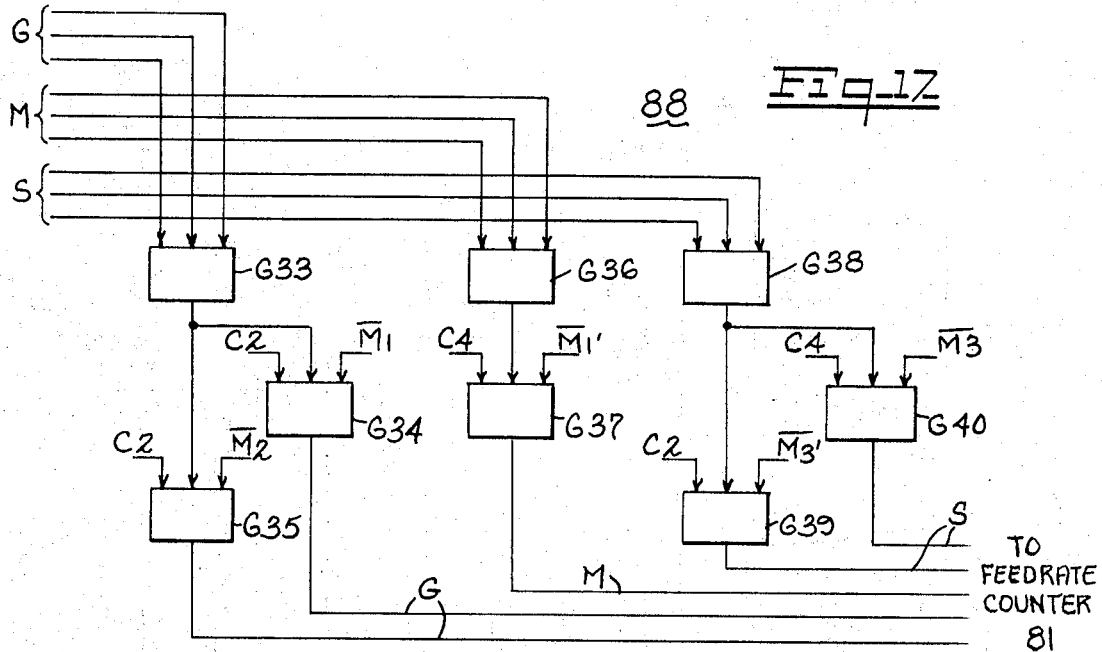

In function gate 88 the lines G from gates G29x, G29y and G29z are applied to an inversion gate G33. When the output of inversion gate G33 is low marker time $\overline{M1}$ during and at clock C2, gate G34 will deliver a decrementing pulse to the $2^1$ stage of feedrate counter 81. Similarly, each recirculation cycle at marker $\overline{M2}$ and clock C2, gate G35 will deliver a decrementing pulse to the $2^{-1}$ stage of feedrate counter 81. The M lines from the network of FIG. 17 are applied to inversion gate G36. When the output of gate G36 is low at clock C4 and marker $\overline{M1'}$ a decrementing count is applied over line M to the $2^0$ stage of feedrate counter 81. The S inputs are applied to inversion gate G38 and the output of gate G38 is applied to coincidence gates G39 and G40 which are opened each recirculation cycle at marker $\overline{M3'}$ and clock C2 and marker $\overline{M3}$ and clock C4 to apply decrementing counts to the $2^{-2}$ and $2^{-1}$ stages of feedrate counter 81, respectively.

Figure 18:
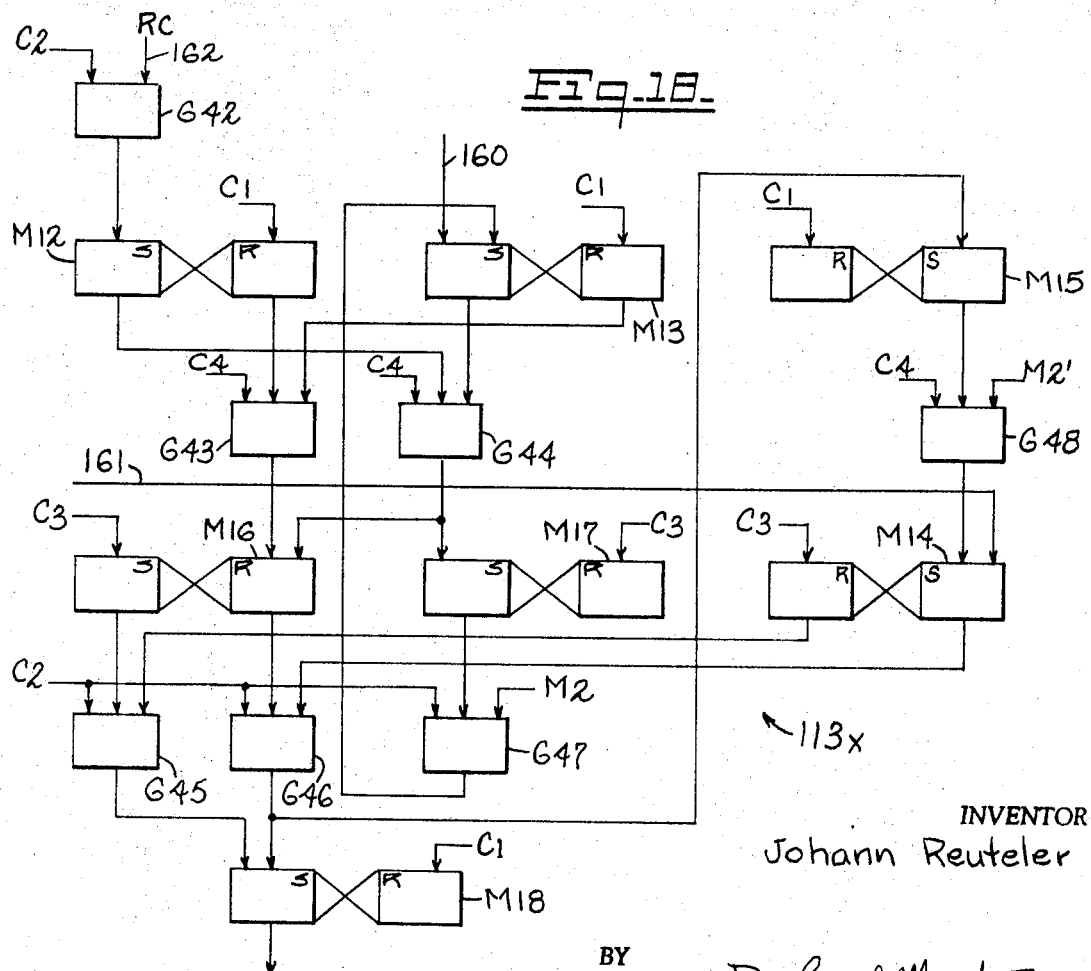

FIG. 18 illustrates the first stage 113x of instantaneous command register 54x. Stage 113x is effective to either add or subtract, and receives an incrementing input over a line 160, a decrementing input over a line 161, and the recirculating contents RC of the overall register over line 162. The recirculating numerical content RC of the entire register is applied through a gate G42 to set a memory M12. Incrementing inputs are applied to memory M13 and decrementing inputs are applied to memory M14. Memory M15 is effective to store a borrow. Gates G43 and G44 are add gates. Gates G45 and G46 are subtract gates. Gate G47 transmits a carry back to memory M13. Gate G48 functions to shift a borrow in memory M15 to memory M14. Memory M16 receives a result from add gates G43 and G44 and memory M17 receives a carry, if present. In operation, assuming only incrementing pulses are applied as the entire contents of the three instantaneous command registers is recirculated, pulse counts are applied over line 160 to set memory M13. This occurs only every other recirculation cycle in the example given. If at this time a recirculation count is passed through gate G42 memory M12 is also set. If both memories M12 and M13 are set at the next clock C4 gates G44 sets memory M17 to indicate the presence of a carry indicating that two binary "1's" have been received at the same time. This will all occur during the second clock cycle of a recirculation cycle. Gate G47 will then set memory M13 to indicate the existence of a carry. However, during the next clock cycle, gate G47 is closed by marker M2 to prevent further propagation of a carry.

If both memories M12 and M13 are set, gate G44 will set memory M17 to indicate a carry as previously described, and reset memory M16. Memory M16 is set every clock cycle at C3 and may be reset through gate G43 or G44. Memories M12 and M13 are reset at C1. Memories M12 and M13 will be reset only when there is no binary "1" on either of lines 160 or 162. Memory M16 when not reset indicates a resultant binary "1" from the addition of a binary "0" and a binary "1." If one of memories M12 or M13 should be set and the other not set, both of gates G43 and G44 will be closed and memory M16 will be set at C3 to indicate a binary "1" bit.

The result of any addition including the recirculating numbers appears each recirculation cycle at memory M18 which is set by one of gates G45 or G46. Gate G45 will set memory M18 at clock C2 if a binary digit indicated by a set condition of M16 is present and memory M14 is reset indicating the lack of presence of a borrow; or if memory M16 is reset and memory M14 is set indicating the presence of a borrow.

Decrementing pulses are applied to set memory M14 over line 161. If memory M14 is set and there is no resultant binary "1" in memory M16, gate G46 will set memory M18. If gate G46 should set memory M18 it will also set borrow memory M15 to indicate a borrow and such borrow will be shifted to gate G48 to set memory M14 at the following C4. Markers M2 and M2' block propagation of borrows and carries beyond the end of the number in the ICR.

In the foregoing described manner, the command pulse counts from summer 112x are applied in incrementing or decrementing counts to instantaneous command register 113x to be properly positioned therein and added to or subtracted from the recirculating contents of the register. Thus ICR 54x will always contain a partial numeric count indicative of the instantaneous commanded position of the controlled part. The partial count is representative of the five least significant bits of the overall position.

An interpolation pulse detector (IPD) as represented by IPD 101x is shown in FIG. 19. Each interpolation pulse detector senses when the sign of the number in its associated recirculation loop does not change in two consecutive introductions of the quantity $L+E_m$ therein and in response to detecting such lack of change produces a command pulse which is applied to the appropriate servo system either as a negative direction pulse or a positive direction pulse. Also, the outputs of the interpolation pulse detectors are applied as decrementing pulses through function gate 88 to feedrate control counter 81 as shown in FIGS. 16 and 17. The number in recirculation loop 60x including remainder register 96x is applied to memory M20 each recirculation cycle subsequent to algebraic addition of $L+E_m$ thereto. Clock C1 sets memory M20 which is reset by a high pulse which is indicative of a negative sign of the number in the recirculation loop. The sign of the number will appear, for example, at marker time M6'. At this time gates G49 and G50 will open to insert the sign of the number in memory M21. When memory M20 is reset, gate G49 will set memory M21 to indicate that the sign of the number in the recirculation loop is negative. If memory M20 should not be reset during $\overline{M6}'$, gate G50 will reset memory M21, and in this condition, memory M21 will indicate that the sign of the number in the recirculation loop is positive. The content of memory M21 is copied into memory M22 by gates G51 and G52 during marker time $\overline{M1}'$. The state of memory M22 will follow the state of memory M21. The output of memory M22 is applied to gates G53 and G54 which also receive the similar output of memory M21. Gates G53 and G54 also receive enabling signals at clock C4 during marker time $\overline{M12}'$. The gates G51 and G52 are opened only once each recirculation cycle to copy the new sign into memory M22. Gates G53 and G54 compare the sign of the number from a previous recirculation cycle with the new sign in the succeeding recirculation cycle upon receipt. If there should be a change in the state of memory M21, gates G53 and G54 will have no output. If there is no change in the state of memory M22, one of gates G53 or G54 will produce a pulse output. Any output from gates G53 and G54 is applied as a decrementing pulse regardless of sign to function gate 88.

Gates G53 and G54 detect if there is no change in the sign by comparing the output from each side of memory M21 with the output of each side of memory M22 as memory M21 is updated each recirculation cycle.

Any output of gates G53 and G54 are applied as setting signals to memories M23 and M24, respectively. Memory M24 will be set if consecutive positive numbers are detected in the recirculation loop. Memory M23 will be set if consecutive negative numbers are detected in the recirculation loop. If memory M23 or memory M24 is set, at the following clock C4, gates G55 and G56, respectively, will produce a command pulse, either positive or negative, dependent upon the commanded direction of travel of the controlled part. Such produced command pulses may be appropriately inverted by gates G57 and G58.

Memories M23 and M24 may also be set to cause production of a command pulse by overflow pulses from lag substractor 117x. Memory M24 is set by a positive lag pulse and memory M23 is set by a negative lag pulse.

It may be observed that the actual interpolation pulse detector ends at gates G53 and G54 and the remainder of the circuit commencing with memories M23 and M24 may be considered a portion of the X axis servo system.

Memories M23 and M24 are reset by markers M7 and M12 at clock C2 during each recirculation cycle. Memories M23 and M24 are set to produce command pulses either by gates G53 and G54 or plus and minus lag signals. Gates G55 and G56 are opened by C4 during marker times $\overline{M1}'$, $\overline{M4}'$ and $\overline{M11}'$ to pass any setting pulses applied to memories M23 and M24 by interpolation or lag pulses. Gates G57 and G58 serve as inverters.

The unite circuit is schematically illustrated in FIG. 20. It will be recalled that the unite circuit accepted the five bits of the instantaneous command register and then annexed to these five bits, eleven bits from the position register to give the instantaneous commanded position of the controlled parts. The manner in which this is accomplished will be explained in conjunction with FIG. 20. However, first a problem that might be involved in forming this interpolated position will be considered. Assuming the controlled part is moving in the positive direction along the X axis, and knowing that there is a lag in the system between the instantaneous commanded position and the actual position as detected by lag subtractor 116x, it will be apparent that the instantaneous commanded position coordinate would be larger than the actual position as expressed in the position register. For example, the position register may contain the coordinate in numerical form as $$000001111111111$$

while the instantaneous command register might contain $$00001$$

It may be readily seen if the least five significant bits of the position register were deleted and the contents of the command register annexed thereto that a substantial error in the interpolated position $X_t$ would result. In the example given, it may be seen that the instantaneous command register is two pulses ahead of the actual position, or otherwise stated, the lag has a value of two pulse counts. Alternatively, if the controlled part was moving in the negative direction with respect to the X axis, the coordinate position of the instantaneous command position would have a smaller numerical value than the coordinate position as expressed by the position register. In such a situation, assume again that the position as expressed by the position register is $$000010000000001$$

and the number in the instantaneous command register is $$11111$$

It may be seen that during the positive direction of movement of the controlled part, the five bits in the instantaneous command register should be normally greater than the five least significant bits in the position register. However, in the example given, the instantaneous commanded position, while greater by two pulse counts than the X coordinate in the position register, is not thus reflected in the five bits shown. Similarly, in the negative direction of motion, the five bits of the instantaneous command register indicate that the instantaneous commanded position is greater than the actual position as shown by the position register. Accordingly, in the two situations set forth correction is required and such correction is accomplished in the unite circuit on the basis of intelligence derived from lag subtractor 116. Lag substractor 116 is arranged to subtract the instantaneous commanded position as denoted by the instantaneous command register 54 from the five least significant bits of the position register. The result of such subtraction will indicate if a compensating function must be made in the unite circuit.

Consider again the first example which indicates that a positive correction must be made to the numerical content of the position register as it passes through the unite circuit.

As the five bits of the ICR are subtracted from the five least significant bits of the position register

```
0000011111 11111 (Position Register)
           00001 (ICR)
           11110
``` the result is

No borrow results and the direction of the lag is negative.

The direction of lag is indicated by the one bit in the fifth place of the position register number which is represented by a (1) one level or binary one signal. Accordingly, the lack of presence of a borrow and the coincident condition of existence of a negative lag indicates that a binary "1" should be added to the $2^5$ bit of the position register which passes through the unite circuit.

In the other example, assume the position register and the instantaneous command register show as follows:

```
0000100000 00001 (Position Register)
           11111 (ICR)
           00010
``` the result is

This result shows a borrow in the fifth binary position and the fifth binary position of the position register at a high level indicating a binary zero bit and a positive lag. These two conditions taken in conjunction indicate that a negative correction is required in the $2^5$ bit of the number in the position register.

Referring now to the unite circuit of FIG. 20, the contents of the instantaneous command register are applied to gate G60 during marker time $\overline{M1}$-$\overline{M5}'$ at clock C4. Thereafter the marker signal to gate G60 goes high and gate G60 is closed. During the time of inverted marker signals $\overline{M6}'$, to $\overline{M0}'$, the eleven most significant bits from the position register are applied to gate G61. These bits when annexed together comprise the interpolated position or the total instantaneous commanded position and are applied as setting signals to memory M26. Gate G62 at marker $\overline{M6}'$ senses from lag subtractor 116 if a borrow has resulted in the fifth bit and if the sign of the lag is positive. If such conditions exist gate G62 sets memory M27 which indicates that a one bit must be subtracted from the $2^5$ bit or, alternatively stated, the first bit entering gate G61. Gate G63 senses the coincident condition from lag subtractor 116 of no borrow in the fifth place and a negative lag sign. If such conditions are sensed at inverted marker $\overline{M6}'$ gate G63 will set memory M28 to indicate that a binary one must be added at the $2^5$ bit of the position register or, otherwise stated, the first bit entering gate G61. Gates G64 and G65 are add gates and gate G66 gates a borrow or decrement from memory M27 to memory M29. Memory M30 stores the result of an addition and memory M31 indicates a carry. Gate G67 will gate a carry in memory M31 back to memory M28 for further addition as the coordinate number is shifted through the unite circuit. Gates G68 and G69 are subtract gates and gate G68 will shift a borrow back to set memory M27, if necessary. Memory M32 is the output memory and each time it is set by one of gates C68 or C69, it gates a binary bit of the interpolated position $X_t$ to subtractor 89$x$ (FIG. 6 or FIG. 10).

The overall operation of the unite circuit of FIG. 20 will be obvious in view of the previous description of the ICR adder 112$x$ previously set forth in FIG. 18.

Figure 21:
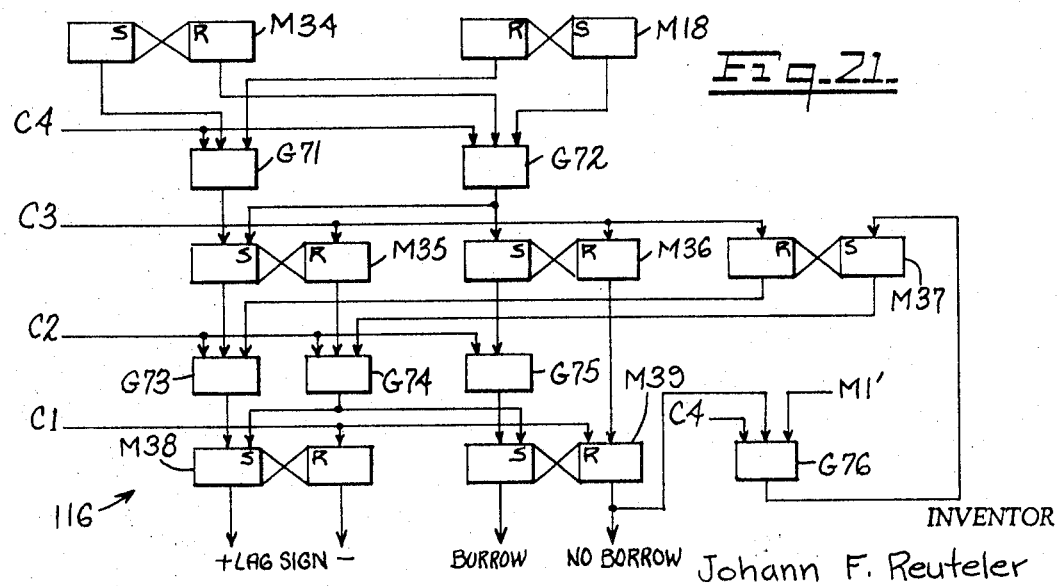

The lag subtractor 116 and the manner in which the lag sign signals and the borrow and no-borrow signals are derived are shown in FIG. 21. Lag subtractor 116 is generally a conventional full stage binary subtractor. The inputs to the subtractor are from memory M18, FIG. 18, of instantaneous command register 113$x$ and from a memory M34 in position register 51 which holds the least significant bit of the binary number representing the coordinate position in the position register at the same time that memory M18 holds the least significant bit of the instantaneous command. The number in the instantaneous command register and in the position register are applied least significant bit first, and numeric sign last to gates G71 and G72 so that the instantaneous command number may be subtracted from the position number. Gates G71 and G72 will indicate the result of this subtraction. Memory M35 stores the partial result of such subtraction and memory M36 stores a borrow, if present. Memory M37 holds a borrow from a previous bit if one is present. Gates G73 and G74 are subtract gates and gates G75 is a shift gate. The result of this bit-by-bit subtraction appears at memory M38. If memory M38 is set at marker time M6', this indicates that a zero bit is present in the resultant subtraction, the arithmetical result is negative, and the lag sign is positive. If memory M38 is reset at marker time M6', this indicates that the numeric result of the subtraction is positive and the lag sign is negative. Memory M39 has the contents of borrow memory M36 copied therein and will indicate the presence or lack of presence of a borrow. Gate G76 at clock C4 will copy a borrow in memory M39 back to memory M37. Gate G76 also receives a marker signal M1' which will prevent further propagation of a borrow. In this manner, the positive and negative lag indications and the borrow and no-borrow signals are derived for application to gates G62 and G63 of the unite circuit, FIG. 20.

It may thus be seen that the objects of the invention set forth above as well as those made apparent from the preceding description are efficiently attained. While preferred embodiments of the invention have been set forth for purposes of disclosure, other embodiments of the invention as well as modifications to the disclosed embodiments may occur to those skilled in the art. Accordingly, the appended claims are intended to cover all embodiments of the invention which do not depart from the spirit and scope thereof.

What is claimed is:

1. In a numerical control system for moving a plurality of parts along associated axes, means providing electrical representations of the actual positions of the parts, means providing electrical representations of the commanded positions, means responsive to the representations for each part for providing a representation of the position error therebetween, means for detecting the largest position error, and means responsive to each position error and the largest position error for generating pulse frequencies corresponding to each position error and the largest position error.

2. The system of claim 1 wherein said pulse frequencies are related by the ratio of each position error to the largest position error.

3. The system of claim 1 further including a recirculating loop for each axis containing a number therein, means for adding said largest position error to each of said loops during each recirculation thereof in a sign opposed to the sign of the number in said loop, means for adding the position error for each axis to its associated loop, and means responsive to said largest position error being added to the number in each loop in the same sign during consecutive recirculations for generating a command pulse.

4. The system of claim 3 further including means for generating a pulse frequency proportional to a programmed feedrate, means for accumulating the pulses of said frequency, means for decrementing said accumulation with said command pulses in predetermined weights, and means responsive to the magnitude of the resulting accumulation for controlling the addition of the position errors to their associated loops.

5. The system of claim 4 wherein the number of parts to be moved is three and said command pulses decrement the accumulation in a ratio of 2.5:1.0:0.75 in the same order of magnitudes of the position errors for the respective axes.

6. The system of claim 4 wherein the number of parts to be moved is two and said command pulses decrement the accumulation in a ratio of 2.5:1 in the same order of magnitudes of the position errors for the respective axes.

7. A numerical control system adapted to move a plurality of parts each along a reference axis between existing points and commanded end points comprising, means for determining the position error of each part between its existing position and its end position, means for determining the largest position error, and means for moving each part at a rate determined by its position error and the largest position error.

8. The system of claim 7, wherein the rate of movement of each part is proportional to $$\frac{E_n}{L+E_m}$$

where $E_n$ is the position error of each part, $E_m$ is the largest position error, and L is a constant.

9. The system of claim 8 further including means for detecting the largest position error.

10. The system of claim 9 further including means for adding the largest position error $E_m$ to the constant L to provide the quantity $L+E_m$.

11. The system of claim 9 further including a recirculating register for each axis containing a number therein, means for adding the quanitiy $L+E_m$ to the number in each loop each recirculation thereof in a sign opposed to the sign of the number in the loop, means for adding each position error to the number in its associated loop during selected recirculations, and means for detecting when the number in said loop does not change in sign in consecutive recirculations thereof.

12. The system of claim 11 further including means responsive to said detecting means of each loop for producing pulse signals in response to detection of no change of sign of the numbers in said loops so that a plurality of pulse trains are produced each having a frequency proportional to the magnitude of a position error.

13. The system of claim 12 further including a plurality of pulse responsive motive means for moving each of said parts along its reference axis, and means for applying each of said pulse trains to one of said motive means.

14. The system of claim 9 further including a recirculating register for each axis containing a number therein, means for adding the quantity $L+E_m$ to the number in each loop each recirculation thereof in a sign opposed to the sign of the number in the loop, means for adding each position error to the number in its associated loop during selected recirculations, and means for detecting when the number $L+E_m$ is added into said loop in the same sign in consecutive recirculations.

15. In a numerical control system for moving a plurality of controlled parts each along a predetermined axis at predetermined relative rates between existing points and commanded end points to define a desired resultant path, pulse responsive means for moving each of said parts along its axis at a rate proportional to the number of command pulses received thereby in a given unit of time, interpolation means for each part for determining the error between its position and its commanded end position and producing command pulses at a rate proportional to such position errors, means providing a train of feedrate pulses having a predetermined repetition rate, means for accumulating a count of said feedrate pulses, said accumulating means being responsive to command pulses for decrementing the count in said accumulating means in a numerical weight predetermined by the relation of magnitudes of the velocities of the parts along their respective axis, and means responsive to the magnitude of the count in said accumulation means for enabling said interpolation means to produce command pulses.

16. The system of claim 15 further including a recirculating loop for each axis containing a first number, means for adding to said number a second number which is the sum of a constant and the largest position error during each recirculation in a sign opposed to the sign of the first number, gating means, said gating means when opened being effective to add the position error for that axis into the recirculation loop, means responsive to said second number being added to said loop in the same sign during consecutive recirculations for producing a command pulse, said accumulating means enabling said gate at a rate predetermined by the magnitude of the number in said accumulating means.

17. A numerical control system for moving a plurality of parts each along a reference axis, a motive means adapted to move each part at a rate proportional to the frequency of command pulses applied thereto and a distance proportional to the number of pulses supplied thereto, a position register responsive to each of said motive means for storing the actual coordinate of its associated part along its reference axis, an instantaneous command register for each part for storing the instantaneous commanded coordinate of the part, means for determining the difference between the commanded coordinate and the actual coordinate, and means for applying pulses to said motive means at a frequency proportional to said difference.

18. The control system of claim 17 wherein said means for determining comprises a subtractor for subtracting said instantaneous commanded position and said actual position, register means for storing the result of said subtraction and adding subsequent subtractions thereto, and means responsive to overflow of said register means for applying command pulses to said motive means.

19. In a numerical control system for moving a plurality of controlled parts each with respect to an associated axis, a plurality of pulse responsive servo systems, means for generating a plurality of pulse frequencies and applying each pulse frequency to one of said servo systems to effect movement of the controlled parts, each of said pulses being representative of a commanded unit of movement, quantizer means associated with each controlled part and responsive to movement thereof for establishing a representation of the instantaneous actual position of each part along its axis, means responsive to each pulse frequency for establishing a representation of the instantaneous commanded position of each part, and means for combining a portion of the instantaneous commanded position with a portion of the instantaneous actual position.

20. The system of claim 19 further including means responsive to the difference in said instantaneous actual and commanded positions for establishing representations of the lags between said positions.

21. The system of claim 20 further including register means for storing said representation and adding subsequent representations thereto.

22. The system of claim 21 further including means responsive to overflow of each of said register means for applying pulse signals representative of said lags to associated servo systems.

23. A system for moving two parts along coordinate axes at relative rates between existing points and commanded end points so as to define an arc about a given center point, means for moving said parts in said coordinate axis system in accordance with the equations $$A_x = \pm E_y{}^E/_{2h}, \text{ and}$$
$$A_y = \pm E_x{}^E/_{2h}$$

Where E is the chord between the existing coordinate point of the parts and the commanded end point, $h$ is the perpendicular to the chord from said given center point, $A_x$ and $A_y$ are the coordinate projections of the perpendicular to the chord at the end point drawn to the tangent to the arc at the existing point, and $E_x$ and $E_y$ are the coordinate projections of the chord E.

24. In a numerical control system including pulse responsive motive means for moving two parts each along a coordinate axis so as to define a resultant arc between an existing point and a commanded end point about a given center point, means for storing the coordinates of the end point with respect to each axis, means for storing the coordinates of the existing point with respect to each axis, means for determining the position error between the existing coordinates and the end point coordinates for each axis, means for determining the largest position error, a recirculating loop for each axis having means for storing a number therein, means for adding said largest error plus a constant to each loop during each recirculation in a sign opposed to the sign of the number in the loop, means for applying the position error for each axis to one of said loops for addition to the number therein or subtraction therefrom in accordance with the slope of the direction of motion of the resultant path and the clockwise direction thereof, and means responsive to said largest error plus a constant being added to said recirculation loops in like sign during consecutive recirculation cycles for producing pulses to said motive means.

25. In a numerical control system including pulse responsive motive means for moving two parts each along a coordinate axis so as to define a resultant arc between an existing point and a commanded end point about a given center point, means for storing the coordinates of the end point with respect to each axis, means for storing the coordinates of the existing point with respect to each axis, means for determining the position error between the existing coordinates and the end point coordinates for each axis, means for determining the largest position error, a recirculating loop for each axis having means for storing a number therein, means for adding said largest error plus a constant to each loop during each recirculation in a sign opposed to the sign of the number in the loop, means responsive to said largest error plus a constant being added to said recirculation loops in like sign during consecutive recirculation cycles for producing pulses to said motive means, means for determining the larger coordinate of the absolute position error, means for determining the smaller coordinate of a line perpendicular to the absolute position error from the center point, means for comparing said larger and smaller coordinates, means responsive to the result of said comparison for selecting the application of said position errors to said recirculation loops and the arithmetical manner in which the position errors are applied to said loops.

26. The system of claim 25 including a further recirculation loop, means for adding said larger coordinate to said further loop in a negative sense, means for adding said smaller coordinate to said further loop in a positive sense, and means responsive to the sign of the number in said further loop for selecting the application of said position errors to said recirculating loops.

27. The system of claim 26 wherein said responsive means upon detection of a positive sign in said further loops causes application of said position errors to their associated loops for algebraic addition therein.

28. The system of claim 26 wherein said responsive means upon detection of a negative sign in said further loop causes application of said position errors to opposite loops with one position error being algebraically added and the other position error being subtracted.

29. A numerical control system adapted to move a plurality of parts each along a reference axis from existing points a specified distance from the existing point to an end point, means providing indications of the distance each part is to be moved, means for detecting the largest distance, and means for moving each part at a rate determined by its distance and the largest distance.

30. The system of claim 29, wherein the rate of movement of each part is proportional to $$\frac{E_n}{L+E_m}$$

where $E_n$ is the distance of each part, $E_m$ is the largest distance, and L is a constant.

31. A system for moving two parts along coordinate axes at relative rates between existing points and commanded end points so as to define an arc about a given center point, pulse responsive means for moving said parts in said coordinate axis system in accordance with the equations $$A_x = \pm E_y^E/_{2h}, \text{ and}$$

$$A_y = \pm E_x^E/_{2h}$$

where E is the chord between the existing coordinate point of the parts and the commanded end point, $h$ is the perpendicular to the chord from said given center point, $A_x$ and $A_y$ are the coordinate projections of the perpendicular to the chord at the end point drawn to the tangent to the arc at the existing point, and $E_x$ and $E_y$ are the coordinate projections of the chord E and represent the position error of each part between its commanded end point and its existing point, comprising means for detecting the position error of each part between its existing point and its commanded end point, means for detecting the largest position error, means for deriving a representation of $h_x$ or $h_y$, where $h_x$ and $h_y$ are the coordinate projections of $h$ along one axis, a number storage means for each axis, means for periodically adding the largest error plus a constant to each number storage means in a sign opposed to the sign of the number in the number storage means, means for applying the position error for each axis to one of said number storage means for addition to the number therein or subtraction therefrom determined by the relative values of $h_x$ and $h_y$, and means responsive to said largest error plus a constant being added to said number storage means in like sign during consecutive additions in said number means for producing pulses to said pulse responsive means.

32. In a numerical control system including pulse responsive motive means for moving two parts each along a coordinate axis so as to define a resultant arc between an existing point and a commanded end point about a given center point, means for storing the coordinates of the end point with respect to each axis, means for storing the coordinates of the existing point with respect to each axis, means for determining the position error between the existing coordinates and the end point coordinates for each axis, means for determining the largest position error, number storage means for each axis, means for periodically adding said largest error plus a constant to each number in the number storage means, means for applying number in the number storage means, means for applying the position error for each axis to one of said number storage means for addition to the number therein or subtraction therefrom in accordance with the slope of the direction of motion of the resultant path and the clockwise direction thereof, and means responsive to said largest error plus a constant being added to said storage means in like sign during consecutive additions in said storage means for producing pulses to said motive means.

References Cited

UNITED STATES PATENTS 3,417,303 12/1968 Reuteler _____ 235—151.11 X
3,286,085 11/1966 Rado _____ 235—151.11

EUGENE G. BOTZ, Primary Examiner

U.S. Cl. X.R.

318—18

PO-1050
(5/69)

UNITED STATES PATENT OFFICE
CERTIFICATE OF CORRECTION

Patent No. 3,538,315  Dated November 3, 1970

Inventor(s) J. F. Reuteler

It is certified that error appears in the above-identified patent and that said Letters Patent are hereby corrected as shown below:

Column 2, line 49, "acutal" should read -- actual --. Column 8, line 49, delete "termed". Column 8, line 54, "herefrom" should read -- therefrom --. Column 11, line 30, "rai" should read -- ratio --. Column 11, line 46, "theerfore" should read -- therefore --. Column 1: line 60, "$\frac{E_m + L}{E_x}$" should read -- $\frac{E_x}{E_m + L}$ --

Column 13, line 12, "pulse" should read -- pulses --.
Column 13, line 63, "112" should read -- $112_x$ --. Column 1 line 1, "112" should read -- $112_x$ --. Column 19, line 1, "our" should read -- occur --. Column 19, line 15, "Marker should read -- Marker --. Column 25, lines 6 and 23, the term "the result is" should be in lines 4 and 22, respectiv Column 25, line 62, "C68 or C69" should read -- G68 or G69 Column 30, line 53, after "number" (first occurrence) delet "in the number storage means, means for applying" and inser storage means in a sign opposed to the sign of the --

Signed and sealed this 30th day of March 1971.

(SEAL)
Attest:

EDWARD M. FLETCHER, JR.
Attesting Officer

WILLIAM E. SCHUYLER,
Commissioner of Pate